United States Patent
Winter

(10) Patent No.: US 11,816,635 B1
(45) Date of Patent: Nov. 14, 2023

(54) SYSTEM AND METHODS OF THREE-DIMENSIONAL PROJECTION MAPPING-BASED VISUAL GUIDANCE FOR ORDER FULFILLMENT

(71) Applicants: Baker Creek Heirloom Seed Co., LLC, Mansfield, MO (US); David Paul Winter, Mansfield, MO (US)

(72) Inventor: David Paul Winter, Mansfield, MO (US)

(73) Assignees: David Paul Winter, Mansfield, MO (US); Baker Creek Heirloom Seed Co., LLC, Mansfield, MO (US)

( * ) Notice: Subject to any disclaimer, the term of this patent is extended or adjusted under 35 U.S.C. 154(b) by 0 days.

(21) Appl. No.: 18/205,756

(22) Filed: Jun. 5, 2023

Related U.S. Application Data

(63) Continuation of application No. PCT/US2023/067837, filed on Jun. 2, 2023.

(60) Provisional application No. 63/404,426, filed on Sep. 7, 2022.

(51) Int. Cl.
*G06Q 10/0875* (2023.01)
(52) U.S. Cl.
CPC .................. *G06Q 10/0875* (2013.01)
(58) Field of Classification Search
CPC .................................................. G06Q 10/0875
See application file for complete search history.

(56) References Cited

U.S. PATENT DOCUMENTS

| | | | |
|---|---|---|---|
| 8,423,431 B1 | 4/2013 | Rouaix et al. | |
| 9,171,278 B1 | 10/2015 | Kong et al. | |
| 9,632,313 B1* | 4/2017 | Madan | G06F 3/011 |
| 10,691,109 B2 | 6/2020 | Wise et al. | |
| 2018/0101810 A1* | 4/2018 | Feng | G06Q 10/1097 |
| 2019/0122174 A1* | 4/2019 | Gil | G06V 20/64 |

FOREIGN PATENT DOCUMENTS

EP 2743215 A1 * 6/2014 ........... B65G 1/1375

OTHER PUBLICATIONS

Butz, "SearchLight—A Lightweight Search Function for Pervasive Environment", 2004 (Year: 2004).*

(Continued)

*Primary Examiner* — Allen C Chein
(74) *Attorney, Agent, or Firm* — COOLEY LLP

(57) ABSTRACT

A three-dimensional projection mapping data display system, method, and non-transitory computer readable storage medium for ubiquitous online order fulfillment, comprising a plurality of material storage bins, each configured to store a particular material, one or more light projection devices, and processing circuitry configured to receive first order information, communicate with the one or more light projection devices to display visual guidance onto a surface of one of the plurality of material storage bins based on the received first order information, the displayed visual guidance indicating a material to be retrieved, receive data corresponding to the material to be retrieved, and update the communication with the one or more light projection devices to display updated visual guidance onto the surface of the one of the plurality of material storage bins based on the received data.

30 Claims, 15 Drawing Sheets

(56) References Cited

OTHER PUBLICATIONS

Funk, "Mobile In-Situ Pick-by-Vision: Order Picking Support using a Projector Helmet", 2016 (Year: 2016).*
"Projection picking system", Feb. 2020, https://www.youtube.com/watch?v=14X5IP1mi6k (Year: 2020).*
A!O!, "Solution/Products", snapshot taken Aug. 15, 2023, https://hello-aioi.com/en/solution/products/digital_picking/pps/ (Year: 2023).*
AIOI, "3D Projection Picking System", Jan. 2020, https://www.youtube.com/watch?v=3MplS60QYao (Year: 2020).*
Screen captures from Facebook video clip entitled "Sneak peek at the Baker Creek new warehouse and picking system," 7 pages, [online], Feb. 13, 2018, by Baker Creek Heirloom Seed Company, [retrieved on Jun. 15, 2023], Retrieved from the Internet: URL:https://www.facebook.com/rareseeds/videos/10156004655816163/.

* cited by examiner

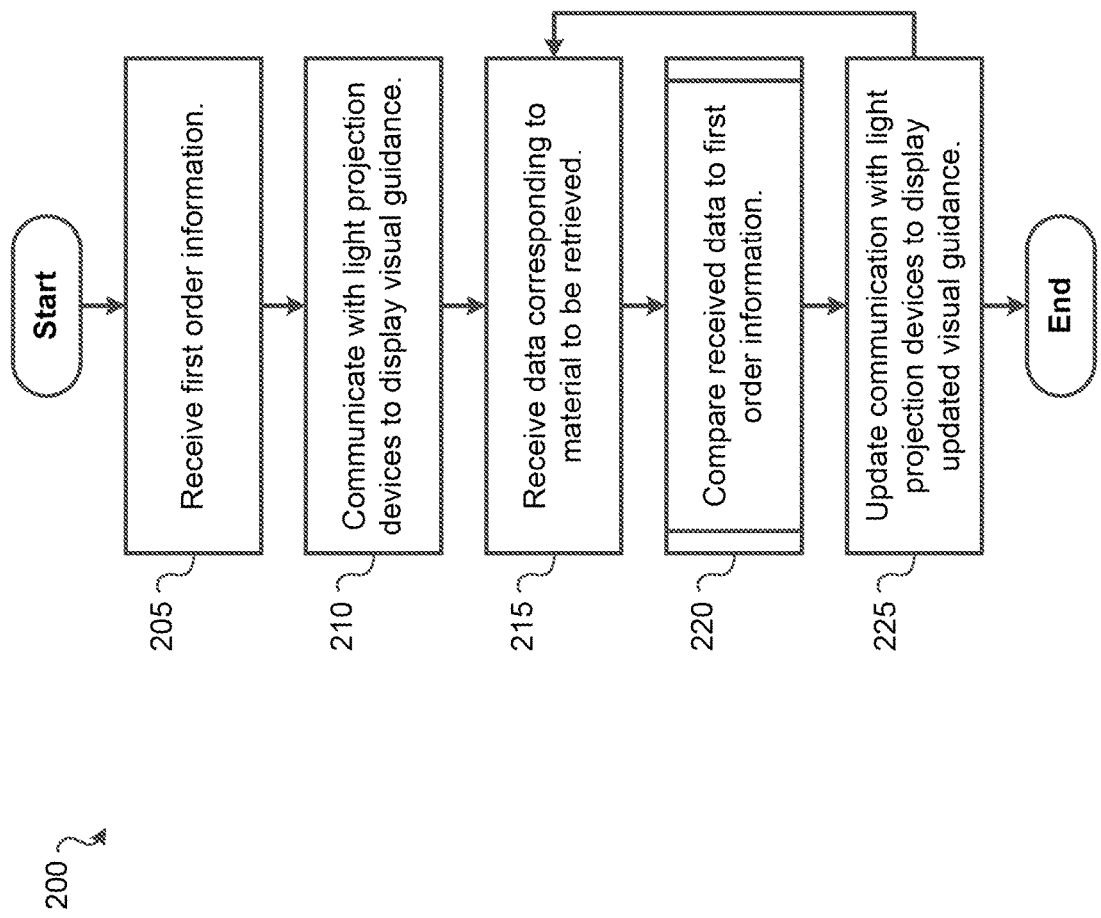

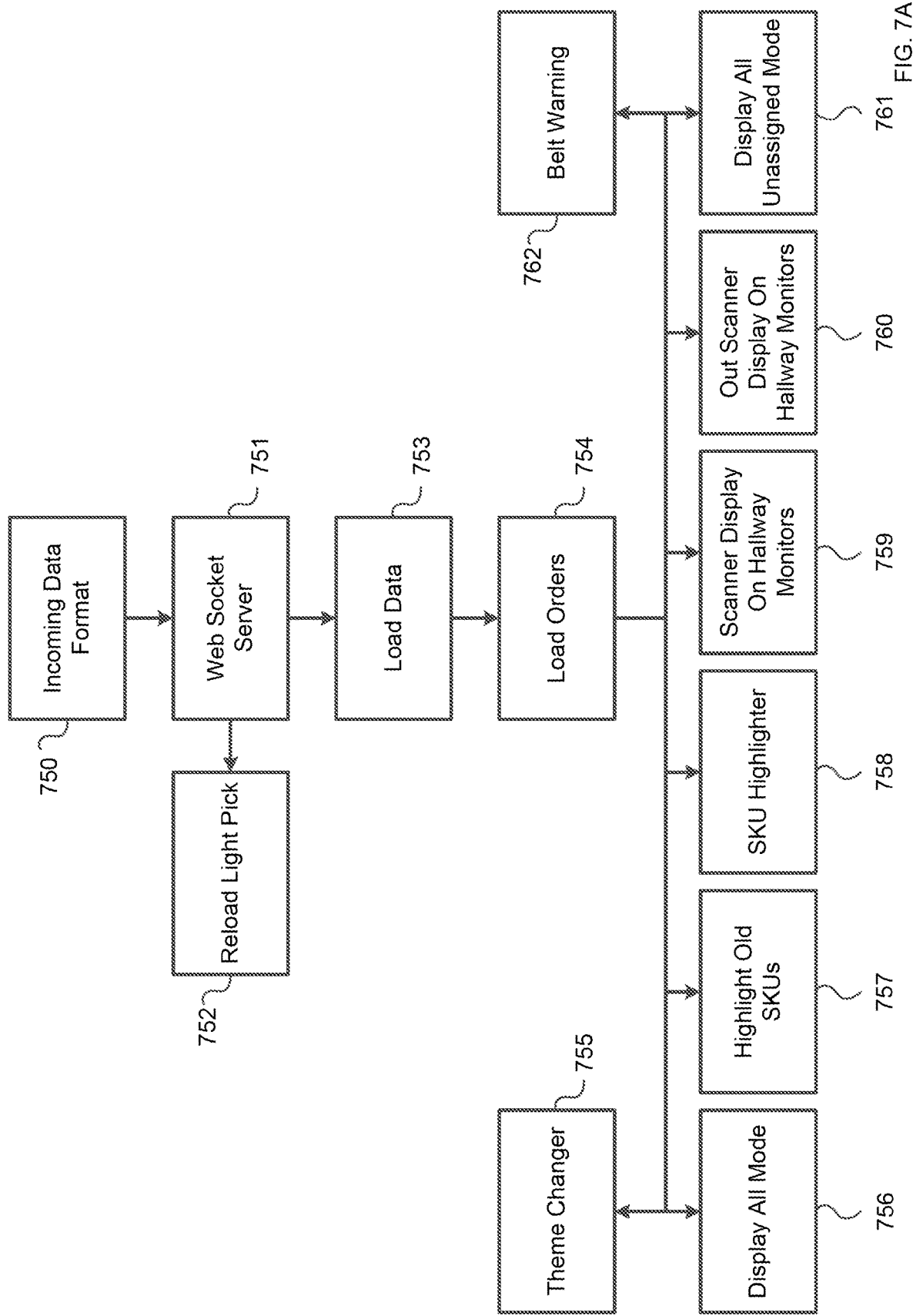

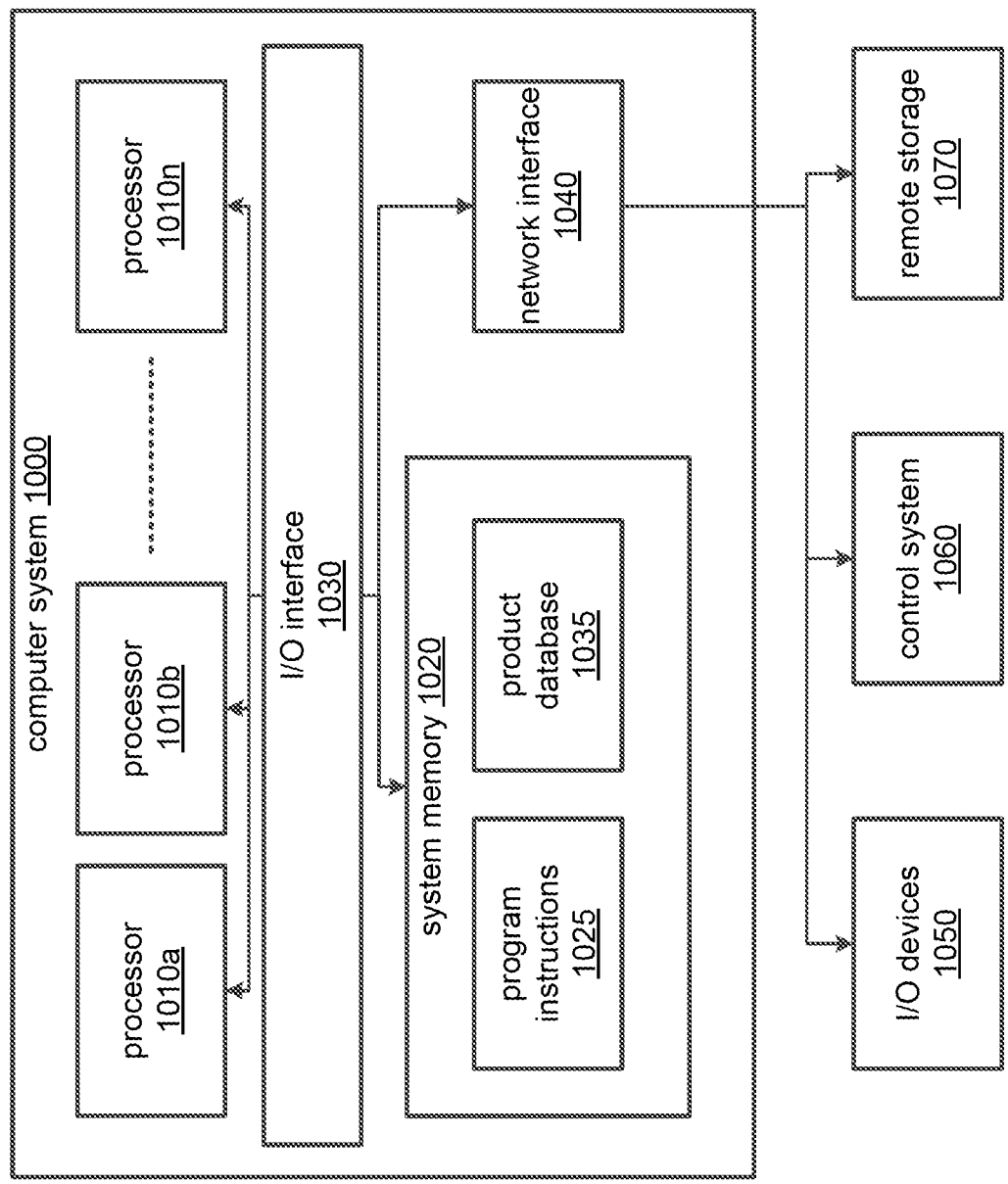

SYSTEM AND METHODS OF THREE-DIMENSIONAL PROJECTION MAPPING-BASED VISUAL GUIDANCE FOR ORDER FULFILLMENT

RELATED APPLICATIONS

This application is a bypass continuation of International Application No. PCT/US2023/067837, filed on Jun. 2, 2023, which claims priority to, and the benefit of, U.S. Provisional Patent Application No. 63/404,426, filed Sep. 7, 2022, the contents of which is hereby incorporated by reference in its entirety.

FIELD OF THE DISCLOSURE

The present disclosure relates to light-based guidance and visual instruction for "picking" inventory.

BACKGROUND

Retailers, wholesalers, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at a material handling facility which may include, but is not limited to, one or more of warehouses, distribution centers, cross-docking facilities, order fulfillment facilities, packaging facilities, shipping facilities, or other facilities or combinations of facilities for performing one or more functions of material (inventory) handling.

The increasing scope of e-commerce, fueled by the ubiquity of smartphones and the like, has resulted in striking changes to the number of options open to customers to shop and pay for items. Virtual storefronts allow customers to view item information including features, specifications, appearance, pricing and availability from their own home or office. When a customer places an order, one or several inventory items specified in the order are retrieved or "picked" from inventory and prepared for delivery to the customer. Traditionally, like items are stored together within inventory to facilitate inventory tracking and management. For example, items having a common Universal Product Code (UPC), Stock-Keeping Unit (SKU) code, International Standard Book Number (ISBN), or other designation (including proprietary designations) may be stored together within inventory. In an inventory environment that includes a large number of many different items, it may be highly inefficient for an employee to physically locate and pick, while counting, every item for a given order. For example, different quantities of different items specified in a given order may be stored within the inventory facility such that a picking associated needs to navigate the facility, correctly identify a requested item, and then pick a correct quantity of the requested item. Correctly identifying the requested item may include examining some number of co-located items in order to determine the specific item to pick, which can be time consuming in situations where numerous similar items are stored together. Additionally, several similarly titled or described items may be stored in a single inventory area, increasing the difficulty of identifying any particular item. The extra time this requires may be significant when multiplied across the large number of orders fulfilled by a typical facility.

Thus, a way of expediting speed and increasing accuracy of order fulfillment is required.

BRIEF SUMMARY

According to an embodiment, the present disclosure is related to three-dimensional projection mapping-based visual guidance for order fulfillment.

In embodiments, the present disclosure further relates to a three-dimensional projection mapping data display system for ubiquitous online order fulfillment, the system comprising a plurality of item storage bins, one or more light projection devices, and processing circuitry configured to receive first order information, communicate with the one or more light projection devices to display visual guidance onto a surface of one of the plurality of item storage bins based on the received first order information, the one of the plurality of item storage bins corresponding to an item requested by the first order information, the displayed visual guidance including a respective item identifier and a quantity of the item to be retrieved, receive data corresponding to a retrieved item, and update the communication with the one or more light projection devices to display updated visual guidance onto the surface of the one of the plurality of item storage bins based on the received data corresponding to the retrieved item, wherein the one or more light projection devices are three-dimensional light-based projectors.

According to an embodiment, the present disclosure further relates to a method of three-dimensional projection mapping data display for ubiquitous online order fulfillment, the method comprising receiving, by processing circuitry, first order information, communicating, by the processing circuitry, with one or more light projection devices to display visual guidance onto a surface of one of a plurality of item storage bins based on the received first order information, the one of the plurality of item storage bins corresponding to an item requested by the first order information, the displayed visual guidance including a respective item identifier and a quantity of the item to be retrieved, receiving, by the processing circuitry, data corresponding to a retrieved item, and updating, by the processing circuitry, the communication with the one or more light projection devices to display updated visual guidance onto the surface of the one of the plurality of item storage bins based on the received data corresponding to the retrieved item, wherein the one or more light projection devices are three-dimensional light-based projectors.

According to an embodiment, the present disclosure further relates to a non-transitory computer-readable storage medium storing computer-readable instructions that, when executed by a computer, cause the computer to perform a method of three-dimensional projection mapping data display for ubiquitous online order fulfillment, the method comprising receiving first order information, communicating with one or more light projection devices to display visual guidance onto a surface of one of a plurality of item storage bins based on the received first order information, the one of the plurality of item storage bins corresponding to an item requested by the first order information, the displayed visual guidance including a respective item identifier and a quantity of the item to be retrieved, receiving data corresponding to a retrieved item, and updating the communication with the one or more light projection devices to display updated visual guidance onto the surface of the one of the plurality of item storage bins based on the received data corresponding to the retrieved item, wherein the one or more light projection devices are three-dimensional light-based projectors.

According to an embodiment, the present disclosure further relates to a three-dimensional projection mapping data display system for ubiquitous online order fulfillment, the system comprising a plurality of item storage bins, one or more light projection devices, and processing circuitry configured to receive first order information, determine, for each item of the received first order information, availability of items defined by the received first order information, communicate, based on the determined availability of the items defined by the received first order information, with the one or more light projection devices to display visual guidance onto a surface of one of the plurality of item storage bins, the one of the plurality of item storage bins corresponding to an item requested by the first order information, the displayed visual guidance including a respective item identifier and a quantity of the item to be retrieved, receive data corresponding to the item to be retrieved, compare the received data to the received first order information, when the comparison indicates one or more items remain to be retrieved, determine, based on the received data, availability of remaining items defined by the received first order information, and update the communication with the one or more light projection devices to display updated visual guidance onto the surface of the one of the plurality of item storage bins based on the determined availability of the remaining items defined by the received first order information and based on the received data, wherein the one or more light projection devices are three-dimensional light-based projectors.

According to an embodiment, the present disclosure further relates to a three-dimensional projection mapping data display system for ubiquitous online order fulfillment, the system comprising a plurality of item storage bins, one or more light projection devices, and processing circuitry configured to receive information regarding one or more outstanding orders, determine availability for a first remaining item of the received information regarding the one or more outstanding orders, communicate, based on the determined availability of the first remaining item of the received information, with the one or more light projection devices to display visual guidance onto a surface of one of the plurality of item storage bins, the one of the plurality of item storage bins corresponding to an item associated with the first remaining item of the received information, the displayed visual guidance including a respective item identifier and a quantity of the item associated with the first remaining item of the received information, receive data corresponding to the item, compare the received data to the quantity of the item associated with the first remaining item of the received information, when the comparison indicates one or more items remain to be retrieved, determine, based on the received data, availability of the one or more items remaining to be retrieved, and update the communication with the one or more light projection devices to display updated visual guidance onto the surface of the one of the plurality of item storage bins based on the determined availability of the one or more items remaining to be retrieved, wherein the one or more light projection devices are three-dimensional light-based projectors.

BRIEF DESCRIPTION OF THE SEVERAL VIEWS OF THE DRAWINGS

FIG. 2 is a flow diagram of a method of three-dimensional projection mapping-based visual guidance for order fulfillment, according to exemplary embodiments.

FIG. 7A is a flow diagram of processes of Light Pick, according to exemplary embodiments.

FIG. 10 is a block diagram illustrating a computer system suitable for use in a material handling facility, or order fulfillment center, that employs a three-dimensional projection mapping-based visual guidance system, according to one embodiment.

DETAILED DESCRIPTION

Definitions

Figure 1:
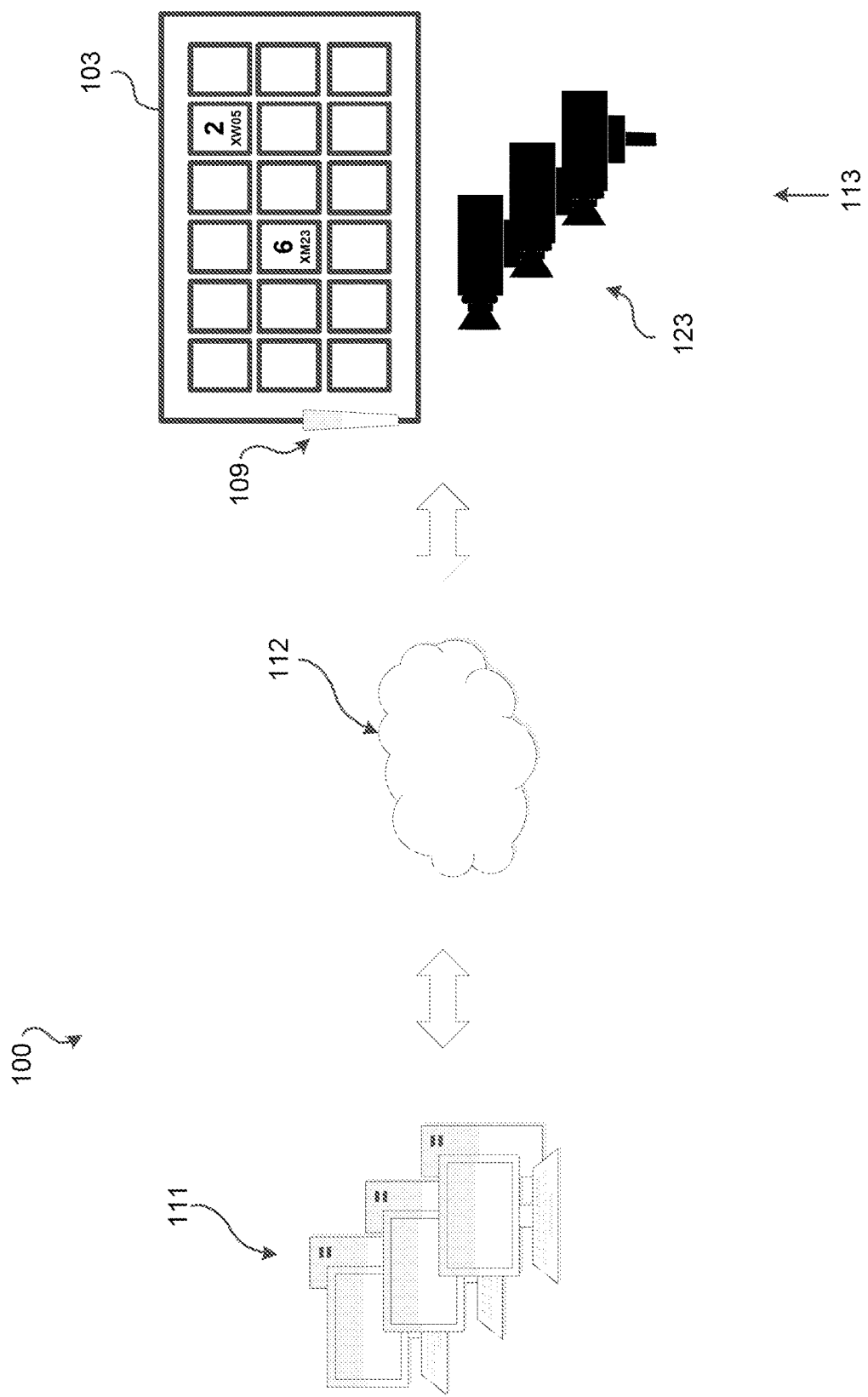
FIG. 1 is a schematic of a system comprising computing devices, a plurality of item storage bins, one or more light projection devices, and a communication network (e.g., a local area network), according to exemplary embodiments.

The term "a" or "an" refers to one or more of that entity, i.e. can refer to plural referents. As such, the terms "a," "an," "one or more," and "at least one" are used interchangeably herein. In addition, reference to "an element" by the indefinite article "a" or "an" does not exclude the possibility that more than one of the elements is present, unless the context clearly requires that there is one and only one of the elements.

Throughout this application, the term "about" is used to indicate that a value includes the inherent variation of error for the device or the method being employed to determine the value, or the variation that exists among the samples being measured. Unless otherwise stated or otherwise evident from the context, the term "about" means within 10% above or below the reported numerical value (except where such number would exceed 100% of a possible value or go below 0%). When used in conjunction with a range or series of values, the term "about" applies to the endpoints of the range or each of the values enumerated in the series, unless otherwise indicated. As used in this application, the terms "about" and "approximately" are used as equivalents.

In item sorting and order fulfillment centers, where thousands of varied items can be stored in item storage bins and the like, each one of the item storage bins being structurally similar and differing only by an item identifier (or similar marker), it can be difficult to locate a product identified by an order and to ensure that are correct amount of the product is picked and placed into a sortation system. This is difficult with one order and is made more difficult when processing tens to hundreds to thousands of orders simultaneously.

Some order fulfillment centers include a pick-to-light system, in which lights mounted on shelves or racks in inventory are programmed to light up to indicate a bin or other storage area in which items having a given product identifier are stored. Such systems may include support for put-to-light operations, as well (e.g., lighting up a container in which items should be stored). However, such systems only identify an inventory location or bin generally, not individual positions or items within the inventory location and not quantities of the individual items that need to be picked. Other order fulfillment centers include a laser-pointer system, in which a laser is mounted to a stationary position and is calibrated to point to a single, pre-determined position for each inventory location (e.g., storage bin) to indicate the entire inventory location. Such technologies do not identify the particular position of the unit of the item within the inventory location from a plurality of possible positions within the inventory location nor do they indicate a quantity of the individual items that need to be picked.

Accordingly, the system and methods of the present disclosure provide a solution enabling an associate at an order fulfillment center (or an associate in another "picking" scenario) to accurately locate an ordered product, to pick a correct amount of the ordered product, and to place the picked item into a sortation system. Such a system and methods may be referred to herein as "Light Pick". In other words, Light Pick makes it easier for picking associates to pick items and do their job more effectively. Therefore, picking operations become faster and more efficient. Light Pick uses three-dimensional (3D) projection mapping to illuminate items to pick. Light Pick shows to the associate a quantity to pick, an item identifier (e.g., a SKU), and location data of the items to be picked. Additionally, Light Pick, can highlight items for search lookup results. Light Pick can colorize zones of items to help with workflow. Altogether, Light Pick helps associates rapidly boost the order fulfillment process, enhancing the order fulfillment process 100$x$ to 1000$x$ when compared with other picking technology.

Real-world implementations of Light Pick within an order fulfillment center improved the speed of picking operations by more than 1300% over previous approaches. For example, without Light Pick, a high-speed semi-automatic sortation system and staff are able to fulfill around 800 orders per day. However, with Light Pick and using the same high-speed semi-automatic sortation system, the same number of staff are able to fulfill around 10,500 orders per day.

Such previous approaches, including those that utilize handheld devices like tablets or smartphones for pick and place operations, are cumbersome and slow. Moreover, Light Pick replaces expensive and difficult to install and maintain products like liquid crystal displays and light-emitting diode displays for picking racks. Instead, Light Pick allows an associate (i.e., employee) to use both hands in picking directly illuminated products. This direct illumination eliminates the need for associates to "hunt" for a product by illuminating the product and showing a quantity of the product to pick. The illumination can also include the SKU for verification, as well as a stock location (e.g., bulk storage location) to indicate to the associate where inventory is located for restocking purposes.

As noted above, Light Pick is used to improve efficiency in a high-speed semi-automatic sortation system. Light Pick boosts efficiency by illuminating boxes of products via three-dimensional projection mapping, a technique by which images and/or video are mapped onto a surface that may or may not be flat (as would be a convention display surface). In this way, a desired image and information therein can be conveyed to an associate without distortion due to an uneven viewing surface. For order fulfilment, the three-dimensional projection physically directs a person to a product and instructs them on a required quantity of the product. The picked product can then be placed on a conveyor belt which feeds a high-speed semi-automatic sortation system.

Light Pick is a three-dimensional projection mapping-based system designed to assist associates in correctly identifying and accurately picking a product. In embodiments, Light Pick is able to show all known picking locations or only show what needs to be picked and fulfilled. In embodiments, Light Pick has a variety of color themes to assist associates that visually perceive colors differently than other staff members. In embodiments, Light Pick utilizes many projectors that are arranged so that "picking" associates may move around and do their job of picking products and placing the products on a conveyor belt with a minimal shadow being cast. Light Pick is modular and can expand to many computers all with many projectors. In embodiments, Light Pick includes monitors that display a list of remaining products on screen(s). The displays may be visible from the entire picking area.

In embodiments, Light Pick utilizes a blend of three-dimensional projection mapping technology and a small item, 40 lane, high-speed semi-automatic sortation system. In embodiments, the small item is a package of heirloom seeds. Each lane features a human machine interface, a scale, and two printers (one printer for receipts and one printer for producing shipping labels). Each lane fills one order and the sortation server sums all the items together for all lanes and sends Light Pick a summed quantity for all 40 lanes. High-speed scanners scan the picked product and the server reduces the quantity to be picked, accordingly. Software checks ensure the accuracy of sorting.

According to an embodiment, the systems and methods described herein relate to a three-dimensional projection mapping data display system for ubiquitous online order fulfillment, the system comprising a plurality of item storage bins, one or more light projection devices, and processing circuitry configured to receive first order information, communicate with the one or more light projection devices to display visual guidance onto a surface of one of the plurality of item storage bins based on the received first order information, the one of the plurality of item storage bins corresponding to an item requested by the first order information, the displayed visual guidance including a respective item identifier and a quantity of the item to be retrieved, receive data corresponding to a retrieved item, and update the communication with the one or more light projection devices to display updated visual guidance onto the surface of the one of the plurality of item storage bins based on the received data corresponding to the retrieved item, wherein the one or more light projection devices are light-based projectors for three-dimensional projection mapping. In embodiments, the one or more light projection devices can be one light projection device, at least two light projection devices, at least 3 light projection devices, at least 4 light projections, at least 5 light projection devices, at least 10 light projections devices, at least 15 light projections devices, and/or at least about 20 light projection devices, in accordance with a size of the order fulfillment center and a total number and arrangement of item storage bins within the order fulfillment center. In embodiments, the plurality of item storage bins can be at least 2 item storage bins, at least 3 item storage bins, at least 4 item storage bins, at least 5 item storage bins, at least 10 item storage bins, at least 20 item storage bins, at least 30 item storage bins, at least 40 item storage bins, at least 50 item storage bins, at least 100 item storage bins, at least 200 item storage bins, at least 300 item storage bins, at least 400 item storage bins, at least 500 item storage bins, at least 1,000 item storage bins, at least 2,000 item storage bins, at least 3,000 item storage bins, at least 4,000 item storage bins, at least 5,000 item storage bins, at least 10,000 item storage bins, and/or at least 20,000 item storage bins.

Referring now to the Drawings, FIG. 1 provides an organizational schematic of an exemplary system of the present disclosure.

According to an embodiment, the systems and methods described herein relate to an order fulfillment system 100. The order fulfillment system 100 may be deployed within an ecosystem comprising an order fulfillment control center 111 comprising computer systems/computing devices/controller devices, a communication network 112, and an order fulfillment center 113 comprising light projection devices 123 (e.g., three-dimensional projection mapping projection devices), item storage bins 103, and image scanning device(s) 109. In embodiments, the order fulfillment system 100 may be physically disposed within a same facility or within separate facilities. The order fulfillment control center 111 and the order fulfillment center 113 may be in wireless or wired communication via the communication network 112.

In embodiments, the order fulfillment control center 111 may receive order information associated with one or more orders submitted by a customer(s). For instance, multiple customers may submit orders, each order specifying one or more items to be shipped to the customer that submitted the order. In some embodiments, the orders may be submitted locally, such as by a customer that is present at the order fulfillment control center 111. In other embodiments, the orders may be submitted remotely, such as through a network (e.g., Internet) based ordering system, a telephone based ordering system, or physical mail (e.g., a catalog ordering system), among other possibilities. Note that a customer(s) may be a consumer, a retailer, a buyer, a seller, or any other entity that submits an order to be fulfilled. Simultaneous with the submitted order information, the order fulfillment control center 111 may receive information related to a current status of each of the item storage bins 103 at the order fulfillment center 113 via the communication network 112. The information related to the current status of each of the item storage bins 103 can be information from the image scanning device(s) 109 and/or information associated with a previous display instruction transmitted from the order fulfillment control center 111 to the light projection devices 123 via the communication network 112. Arrangement and interactions between the item storage bins 103 and the image scanning device(s) 109 will be described in more detail with reference to FIG. 5A and FIG. 5B. Control and interactions between the order fulfillment control center 111 and the order fulfillment center 113 will be described in more detail with reference to the following flow diagrams.

In embodiments, the image scanning device(s) 109 may be a handheld, mobile, and/or fixed scanner(s) or scanning device(s) configured to scan the marks or tags on individual items and/or inventory areas to determine and record an identifier of an item and/or an item location. Accordingly, the recorded information can be used to update visual guidance provided to associates via the light projection devices 123. It should be appreciated that the image scanning device(s) 109 may, in some instances, capture images of each picked item such that computing device(s) of the order fulfillment control center 111 can perform image processing on the captured images to determine an identity thereof and to update the visual guidance on this basis. In other instances, the image scanning device(s) 109 may be an indirect tracking device that utilizes e.g., radiofrequency identification (RFID). In embodiments, to fulfill the received customer(s) orders, the one or more items specified in each order may be retrieved or "picked" from inventory, which are stored or sorted within the item storage bins 103 at the order fulfillment center 113. In embodiments, the items may be identified from inventory based on information presented to facility associates using a light-based display system, as described herein. The information presented to the associate may be presented on a surface of one or more of the item storage bins 103 and may include a description of the items to be picked, a number of the items to be picked, and other relevant information. The light-based display system may comprise the light projection devices 123, which may be mounted within the facility and may project visual guidance onto the item storage bins 103. The light projection devices 123 may include a light-based projector, such as a light emitting diode (LED) projector, a laser-based projector, or a combination thereof, and the like. Picked items may be positioned on a conveyance system of the order fulfillment center 113 and delivered to an order sorting and packing area for sorting into respective orders and packing for shipping.

In embodiments, items in inventory may be marked or tagged with a bar-code, an RFID tag, a UPC, a SKU code, an ISBN, a serial number, and/or other designation (including proprietary designations) to facilitate operations at the order fulfillment center 113 and more broadly within the order fulfillment system 100.

In embodiments, the light projection devices 123 may be fixed-location and/or movable light projection devices 123. For example, an array of such devices may be mounted on the ceiling of the facility and/or a series of such devices may be mounted on walls, floors, poles, or shelving units within the order fulfillment center. The light projection devices 123 may be vibrationally isolated from the order fulfillment center. This is aided by mounting of the light projection devices 123, in an example, to a frame that only contacts a floor of the order fulfillment center, thereby minimizing movement due to sonic booms, thunder, hail, and the like. In embodiments, the light projection devices 123 are mounted at heights from the ground and distances from the item storage bins 103 that permit projection of visual guidance on all of the item storage bins 103. In an example, the light projection devices 103 are mounted at a height of approximately 9' from the ground and at a distance of about 9' from projection surfaces of the item storage bins 103.

In embodiments, the light projection devices 123 may be networked together (e.g., wirelessly or by wire) and/or configured to communicate with the order fulfillment control center 111 to receive messages including instructions executable to initiate displaying visual guidance information. The light projection devices 123 may be configured to receive encoded program instructions, text files, graphics files, and/or image data from the order fulfillment control center 111. In embodiments, software drivers for projecting received text, graphics, and/or image files may be executed by processors on the light projection devices 123. For example, various light projection devices 123 may be configured to accept and project information received in one of several vector graphics formats or raster graphics formats, such as a Microsoft Windows bitmap (BMP), computer graphics metafile (CGM), graphic interchange format (GIF), PC Paintbrush format (PCX), JPEG file interchange format (JPEG), tagged image file format (TIFF), scalable vector graphic (SVG), Microsoft Windows media format (WMF), progressive graphics file (PGF), raw image format, portable network graphics (PNG), HD Photo (HDP), X Pixmap (XPM), Multiresolution Seamless Image Database (MrSID), and/or other formats.

In embodiments, the light projection devices 123 are configured to illuminate particular item storage bins of an array of the item storage bins 103, as instructed by the received text, graphics, and/or image files executable by processors on the light projection devices 123. In embodiments, this spatially-controlled illumination is based on fixed positions of the light projection devices 123 relative to fixed positions of the item storage bins 103. Each of the item storage bins 103 can then be mapped to a particular inventory item and a labeled map of the array of item storage bins 103 can be generated and stored at one or more of the order fulfillment control center 111, the communication network 112, and the order fulfillment center 113 (e.g., the light projection devices 123). The labeled map can be iterative generated in real-time on the basis of newly stored items, newly picked items, and the like. When a labeled map is stored at the light projection devices 123 and/or is readily accessible to the light projection devices 123, instructions for visual guidance need only include item identifiers such as unique product codes, a quantity to be picked, and the like. The processors can then perform the mapping between the unique product codes and the item storage bins 103 on the basis of the labeled map. Of course, it can be appreciated that such mapping process can alternatively be performed at one or more of the order fulfillment control center 111 and the communication network 112 in reliance on the fixed spatial relationships between the item storage bins 103 and the light projection devices 123. In other embodiments, as a combination with the above, a labeled map is not stored at the order fulfillment center 113 and visual guidance instructions received from the order fulfillment control center 111 include spatial/directional instructions regarding a position of an item storage bin containing an inventory item having a unique product code. In this instance, instructions received at the order fulfillment center 113 (e.g., by the light projection devices 123) includes unique product codes, quantities to be picked, and a spatial location of a respective item storage bin such that the appropriate visual guidance can be displayed.

To this end, the cartoon within the order fulfillment center 113 of FIG. 1 illustrates an array of item storage bins 103. A surface of each of the item storage bins 103 may be a display surface upon which the above-described visual guidance can be projected by the light projection devices 123. For instance, as shown in the cartoon, the visual guidance may include a quantity of an item to be picked and an identifier associated with the item to be picked. Such visual guidance will be described in more detail with respect to FIG. 5A and FIG. 5B. In embodiments, the order fulfillment control center 111 may communicate with the light projection devices 123 according to any of a number of different communication protocols, such as via TCP/IP, HTTP, 802.11, Bluetooth, and the like. The order fulfillment control center 111 may send a message including picking instructions, location, position, and/or descriptive information, and/or projection instructions to the light projection devices 123. In embodiments in which the light projection devices 123 are configured to receive encoded location, position and/or descriptive information and to analyze or interpret it for projection, the number of bytes required to transmit the location, position, and/or descriptive information may be small enough that attaching it to a message that is already being sent may be more efficient than the overhead required to send another message just for the additional information. For example, position or pattern information (e.g., a count value corresponding to an item's storage location, or an encoded indicator of an items color) may be small enough to insert into an unused field of an existing message, such as one used to send picking instructions, and may therefore be sent with no or almost no increase in required bandwidth, according to certain embodiments.

In embodiments, a number of light projection devices 123 deployed within the order fulfillment center 113 may be one. In embodiments, in order to preserve quality of the visual guidance and to avoid, for instance, shadows, a plurality of light projection devices 123 may be used. As alluded to above, each of the plurality of light projection devices 123 may be networked together and may share projection instructions in order optimize performance.

Referring now to the methods described herein, method 200 of FIG. 2 relates to a method of online order fulfillment. Each online order may be for an item or items that can be organized and stored in item storage bins within a storage center, such as a warehouse, as described above with reference to FIG. 1. In embodiments, the item or items can be packages containing heirloom seeds.

Method 200 relates to processing of a single order as it may relate to a single sorting lane. It can be appreciated that method 200 is simplified merely for discussion purposes but can be increasingly complex in order to accommodate multiple orders and multiple sorting lanes. Such instances will be described with reference to FIG. 4, wherein method 200 is expanded to processing of multiple orders corresponding to and utilizing multiple sorting lanes.

At step 205 of method 200, first order information can be received by a computing device(s) at the order fulfillment control center. The first order information is information related to a first order and defines one or more items to be picked from inventory and shipped (or otherwise delivered) to the customer. The first order information may, for instance, provide a list of unique product codes and a quantity to be picked for each unique product code.

At step 210 of method 200, the computing device(s) of the order fulfillment control center communicates visual guidance instructions to the light projection devices of the order fulfillment center via the communication network. The light projection devices may receive the visual guidance instructions and generate the appropriate image projections as visual guidance to associates for picking. One or more associates may perform picking for a same order or for different orders.

At step 215 of method 200, the computing device(s) of the order fulfillment control center receives data from image scanning device(s) of the order fulfillment center via the communication network. This data, which can be referred to as first order status data, reflects when an associate has picked an item and placed it on a main conveyer of a conveyance system connected to the single sorting lane. Step 215 of method 200 will be described in greater detail with reference to FIG. 3B, but it can be appreciated that an item picked by an associate can be logged by the image scanning device(s) or other tracking system.

At sub process 220 of method 200, the computing device(s) of the order fulfillment control center compare the received first order status data received from the image scanning device(s) with the received first order information to determine whether the first order has been fulfilled. In the event the first order has been fulfilled, at step 225 of method 200, the communication with the light projection devices of the order fulfillment center can be updated so that no projection/display is provided. In the event the first order has not yet been fulfilled, the communication with the light projection devices of the order fulfillment center at step 225 of method 200 can be an update to reflect a reduced quantity remaining to be picked for a particular item within the first order information or can be an update to remove projection/display related to a particular item of the first order information when that particular item has been fulfilled. Of course, when data corresponding to the first order is received but does not indicate that a particular item within the first order information has been picked, no update to the visual guidance is appropriate for that particular item. Further detail of sub process 220 of method 200 will be described with reference to steps 381 and 382 of FIG. 3B.

As shown in FIG. 2, step 215 through step 225 of method 200 can be iterative until the entirety of the first order is fulfilled.

Figure 3A:
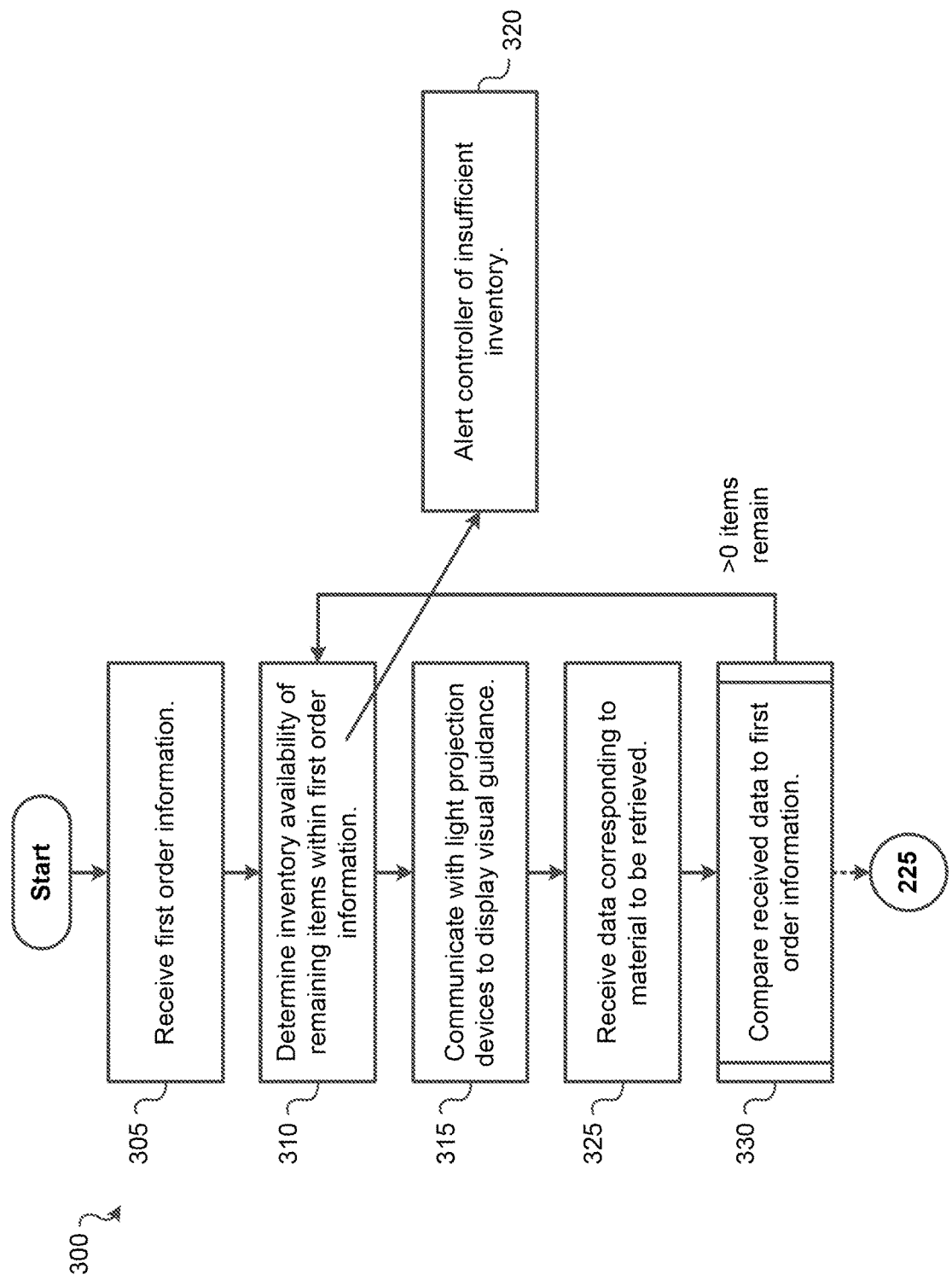
FIG. 3A is a flow diagram of a method of three-dimensional projection mapping-based visual guidance for order fulfillment, according to exemplary embodiments.

Referring now to FIG. 3A, method 300 relates to a method of online order fulfillment and a particular instance when an insufficiency is detected. As with method 200, however, method 300 will only be described in the context of a single order and a single sorting lane. Similarly, method 300 can be extrapolated and is relevant to more complex systems.

At step 305 of method 300, first order information can be received by a computing device(s) at the order fulfillment control center. The first order information is information related to a first order and defines one or more items to be picked from inventory and shipped (or otherwise delivered) to the customer. The first order information may, for instance, provide a list of unique product codes and a quantity to be picked for each unique product code.

At step 310 of method 300, the computing device(s) of the order fulfillment control center determine availability of the remaining items within the first order information at the order fulfillment center. In embodiments, alongside the labeled map of the item storage bins at the order fulfillment center, an initial state map of the item storage bins can be generated (and updated) alongside the item storage bin mapping that was previously described as generated by/used by the light projection devices to provide spatially accurate projections. The initial state map of the item storage bins may be generated at the computing device(s) at, for instance, the beginning of an order fulfillment shift. This process may be automatic or manual. Generating the initial state map of the item storage bins includes assigning an identity to each of the item storage bins of the array of item storage bins, assigning an initial quantity of each identified item within the item storage bins, and associated any additional information relevant to a particular item with the respective item storage bin. The additional information may include, for instance, instructions regarding where additional inventory stock is located, information regarding a next item to be placed within the item storage bin, and information regarding whether the item is being discontinued.

Therefore, when it is determined at step 310 of method 300 that a first item of the first order information is no longer available in the item storage bin, an alert can be generated at step 320 of method 300. The alert may be an alert at the computing device(s) of the order fulfillment control center and/or a visual guidance on the item storage bin alerting the associate that the order cannot be fulfilled from the item storage bin. In certain instances, the visual guidance on the item storage bin may be an indication of a location from where additional inventory may be retrieved.

When it is determined at step 310 of method 300 that sufficient inventory remains at the item storage bin, method 300 proceeds to step 315 and the computing device(s) of the order fulfillment control center communicates instructions to the light projection devices of the order fulfillment center via the communication network to display visual guidance on the item storage bin.

At step 325 of method 300, the computing device(s) of the order fulfillment control center receives data corresponding to the item to be retrieved from the order fulfillment center via the communication network. As in method 200, the data corresponding to the item to be retrieved may be obtained from an image scanning device(s) configured to obtain an image of or scan an identifying code of a retrieved item and transmit corresponding information to the order fulfillment control center. As above, this data, which can be referred to as first order status data, reflects when an associate has picked an item and placed it on a main conveyer of a conveyance system connected to the single sorting lane.

At sub process 330 of method 300, the computing device(s) of the order fulfillment control center compare the received first order status data received from the order fulfillment center with the received first order information (step 305) to determine whether additional items remain to be picked. Greater detail of sub process 330 of method 300 will be described with reference to steps 381 and 382 of FIG. 3B.

In embodiments, when the comparison at step 330 of method 300 indicates no more items requested by the first order information remain to be picked, the process proceeds to step 225 of method 200 and instructions to the light projection devices at the order fulfillment center are updated and transmitted.

In embodiments, when the comparison at step 330 of method 300 indicates additional items remain to be picked, method 300 returns to step 310, and step 310 to step 330 of method 300 are iteratively performed until the comparison at step 300 indicates no more items requested by the first order information remain to be picked.

Figure 3B:
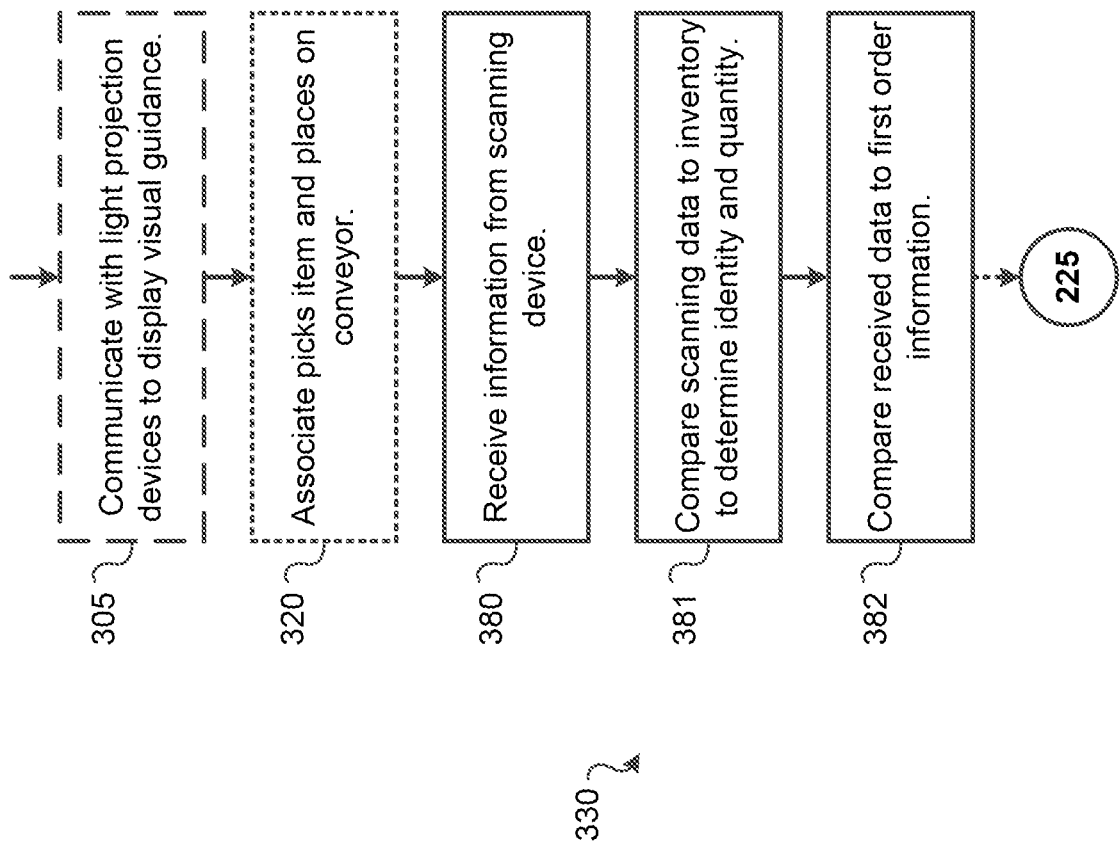
FIG. 3B is a flow diagram of a sub process of a method of three-dimensional projection mapping-based visual guidance for order fulfillment, according to exemplary embodiments.

Referring now to FIG. 3B, sub process 3330 of method 300 will be described in more detail. Dashed lines indicate steps occurring prior to subprocess 330. Shorter dashes indicate a step not performed by the order fulfillment system of method 300. Instead, it can be appreciated that step 320 is performed by an associate (which may be a human or, in some cases, an automated robot configured to pick items).

At step 320, and in response to visual guidance by the light projection devices at step 305, an associate may pick an item according to the visual guidance and place the item on main conveyer of a conveyance system of the order fulfillment center. Subsequently, at step 380, information can be received from an image scanning device(s). The image scanning device(s) may be a handheld, mobile, and/or fixed scanner(s) or scanning device(s) configured to, in one instance, scan the marks or tags on individual items to determine and record an identifier of a picked item and/or an item location. In another instance, the image scanning device(s) may be configured to obtain images of the marks or tags on individual items and/or to obtain images of individual items themselves.

At step 381 of subprocess 330, the scanning data received at step 380 may be evaluated in view of inventory and in view of the first order information. For instance, when the received data is a UPC of the picked item, the UPC can be compared with known UPCs from the inventory and identified, accordingly. A quantity of the picked item can be determined, logically. In another instance, when the received data is an image of the picked item, image processing may be performed to identify the item picked. To this end, the image processing may include image recognition and/or text recognition and may include comparisons of extracted images and/or texts with corresponding images and/or texts stored within a database corresponding to the inventory of the order fulfillment center. As with the UPC, a quantity of the items picked and evaluated by image processing can be determined, logically.

In embodiments, the scanning data may be generated by an indirect tracking device that utilizes e.g., RFID. In this instance, a tracking device may be worn by an associate and each item within the item storage bins may be equipped with an RFID tag. Each RFID tag may include a unique identifier that corresponds to the respective item. The location of the respective item to which the RFID tag is attached, and/or other information relevant to the respective item, may be associated with the unique identifier of the RFID tag and stored such that it is accessible by the order fulfillment control center. Accordingly, the tracking devices worn (or otherwise carried) by associates can be used to read the RFID tag of a corresponding item picked. Read information can then be used by the computing device(s) of the order fulfillment control center to determine whether a relevant portion of a submitted order has been fulfilled and whether visual guidance for the relevant portion needs to be modified, as will be described below with reference to step 382.

At step 382 of subprocess 330, the identified and quantified picked items can be compared to the first order information. Such comparison has been described above and comprises determining whether additional items remain to be picked and, in certain instances, whether the additional items to be picked are available inventory. Based on the comparison at step 382 of subprocess 330, the process proceeds to step 225 of method 200 and instructions to update visual guidance provided to associates via the light projection devices can be transmitted.

It can be appreciated that, in the event multiple sorting lanes are used to sort items corresponding to multiple different orders, any of the above-described methods can be executed such that light projection device(s) display all of the required items and amounts corresponding to each of the required items as defined by all of the multiple different orders. In this way, it is not necessary to fulfill each order independently. Instead, in an example where multiple orders have requested a particular quantity of "Item X", the total quantity of "Item X", summed across the multiple orders, can be displayed on a respective item storage bin to instruct that an associate on the amount of "Item X" required by the orders being presently processed. When an associate picks the total quantity of "Item X" and places it on the conveyor belt, each package can be individually sorted at the sortation system into respective lanes corresponding to particular orders.

Figure 4:
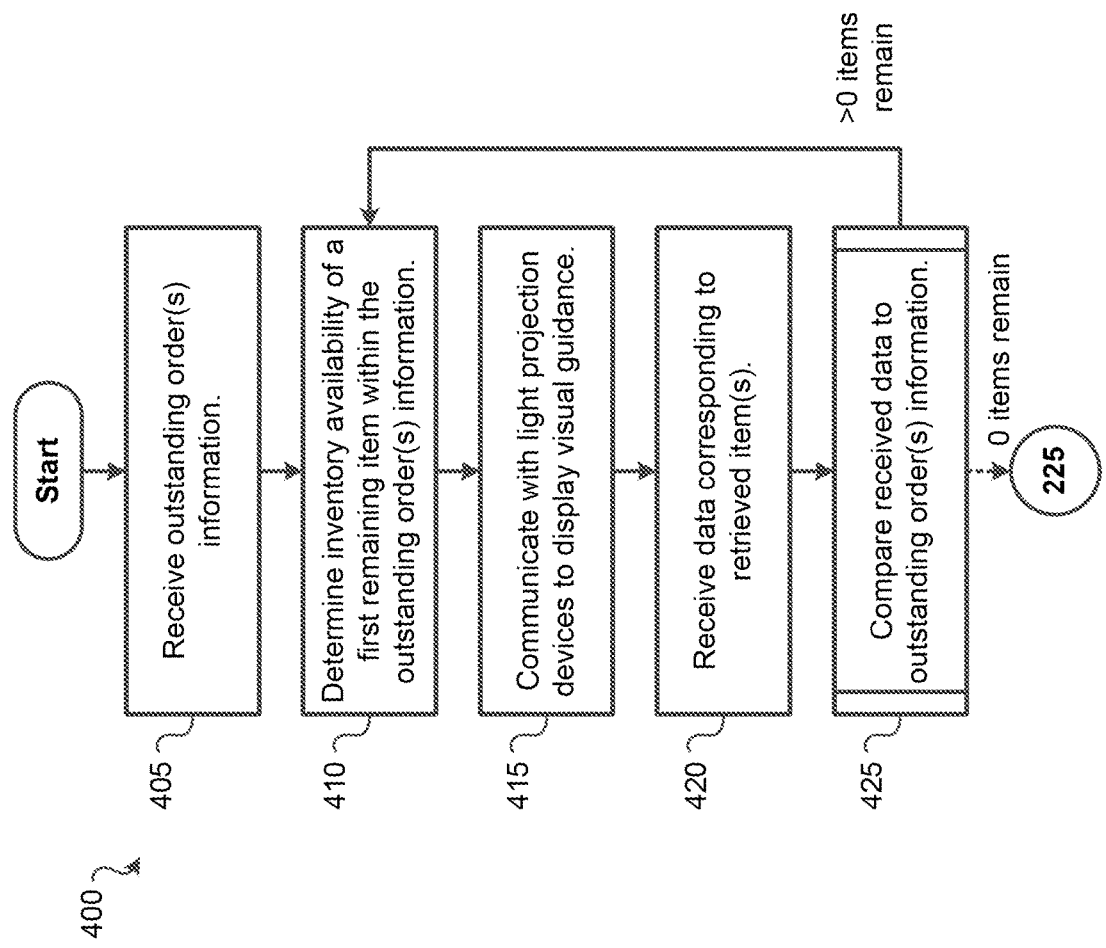
FIG. 4 is a flow diagram of a method of three-dimensional projection mapping-based visual guidance for order fulfillment, according to exemplary embodiments.

To this end, FIG. 4 is a flow diagram of high-speed and high-throughput method 400 when multiple orders and multiple sorting lanes are used.

At step 405 of method 400, outstanding order information can be received by a computing device(s) at the order fulfillment control center. The outstanding order information can be information related to all orders currently being processed by the order fulfillment system and can define a plurality of items to be picked from inventory and shipped (or otherwise delivered) to corresponding customers. Each order within the outstanding order information may, for instance, provide a list of unique product codes and a quantity to be picked for each unique product code for a respective order.

Figure 5A:
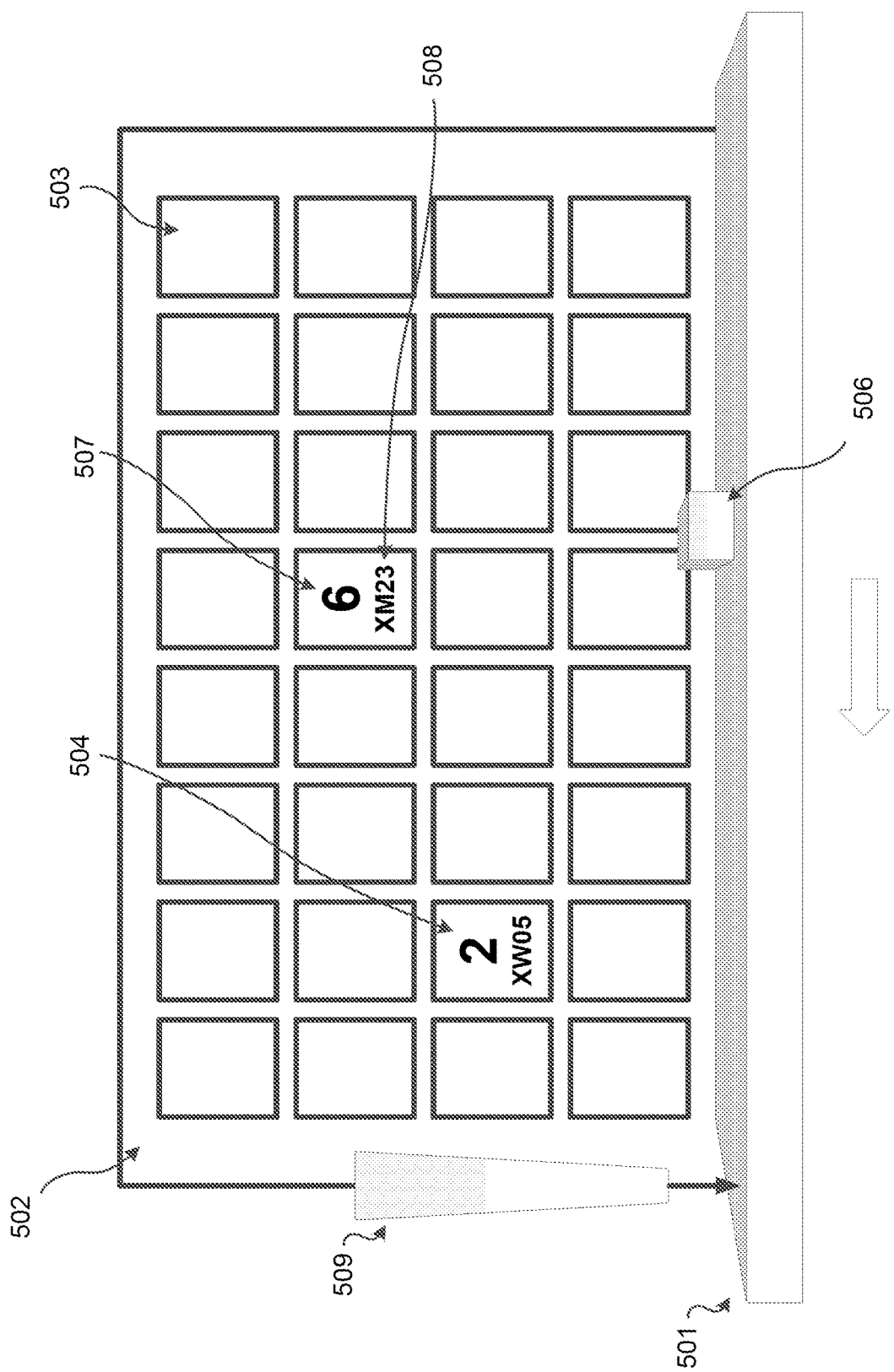
FIG. 5A is an illustration of a plurality of item storage bins within an order fulfillment center, according to exemplary embodiments.

In embodiments, the multiple sorting lanes are a portion of a conveyance system within a sorting area of the order fulfillment center. The conveyance system includes a single main conveyer, as shown in FIG. 5A, which is positioned proximate a picking area of the order fulfillment center, and proximate the item storage bins. The single main conveyer may be a conveyer belt that delivers all picked items from the picking area to the sorting area. The multiple sorting lanes within the picking area may branch from and be integrated with the single main conveyer such that items from the single main conveyer, once identified by a scanning device(s), can be properly sorted into a particular sorting lane.

In embodiments, the multiple sorting lanes dictate that at least that many orders can be fulfilled simultaneously. For instance, at least 2 orders, at least 3 orders, at least 4 orders, at least 5 orders, at least 10 orders, at least 15 orders, at least 20 orders, at least 25 orders, at least 30 orders, at least 35 orders, and/or at least 40 orders can be processed concurrently.

Moreover, by using multiple sorting lanes in concert with a single main conveyer, all items can be picked from a common area (i.e., picking area). To this end, and referring now to step 415 of method 400, the computing device(s) of the order fulfillment control center communicates visual guidance instructions to the light projection devices of the order fulfillment center via the communication network, the visual guidance instructions being based on the determined availability of items requested in the outstanding order(s) information. The light projection devices may receive the visual guidance instructions and generate the appropriate image projections as visual guidance to associates for picking. For instance, the visual guidance may communicate a quantity of a particular item to be picked, wherein the quantity reflects multiple user orders specifying the same item.

At step 420 of method 400, similar to step 215 of method 200 and to step 325 of method 300, the computing device(s) of the order fulfillment control center receives data from image scanning device(s) of the order fulfillment center via the communication network. This data, which can be referred to as order status data, reflects when an associate(s) has picked an item, or more than one item, and has placed it on a main conveyer of a conveyance system connected to the multiple sorting lane.

At sub process 425 of method 400, the computing device(s) of the order fulfillment control center compares the received order status data received from the image scanning device(s) with the received outstanding order(s) information to determine whether the outstanding order(s) has been fulfilled. In the event the outstanding order(s) has been fulfilled, the communication with the light projection devices of the order fulfillment center can be updated at step 225 so that no projection/display is provided. In the event the outstanding order(s) has not yet been fulfilled (i.e., >0 items remain to be picked), the communication with the light projection devices of the order fulfillment center at step 225 can be an update to reflect a reduced quantity remaining to be picked for a one or more items within the outstanding order(s) information or can be an update to remove projection/display related to particular items of the outstanding order(s) information when those particular items have been picked, or fulfilled. Of course, when data corresponding to the outstanding order(s) is received but does not indicate that a particular item within the outstanding order(s) information has been picked, no update to the visual guidance is appropriate for that particular item.

As shown in FIG. 4, step 410 through step 425 of method 400 can be iterative until the entirety of the outstanding order(s) is fulfilled.

In embodiments, after picking, the main conveyer delivers the picked items to the multiple sorting lanes of the sorting area. In the instance that each sorting lane corresponds to a particular order, scanning device(s) may be arranged immediately upstream from each sorting lane so that, in real time, an identity of a picked item can be made known and can be diverted from the main conveyer to a particular sorting lane if the identity of the picked item matches with requested order information associated with the particular sorting lane. In this way, a picking associate may pick a sum quantity of a particular item independent of which particular customer requested the item, and the items will be diverted as appropriate when the reach the sorting area.

Referring now to FIG. 5A, an exemplary array of item storage bins 502, a main conveyer 501, and an image scanning device 509 at an order fulfillment center are shown. An arrow indicates the direction of movement of the main conveyer 501. An item 506, picked from one of the item storage bins 503 by an associate, travels along the main conveyer 501 toward the image scanning device 509. Visual guidance 504 is provided on two of the item storage bins 503. While it may be that the item 506 currently on the main conveyer 506 is from an upstream item storage bin and has already been accounted for, it can be assumed for descriptive purposes that the visual guidance 504 has not already accounted for the item 506. As the item 506 passes underneath the scanning device 509, data can be sent to the order fulfillment control center and subsequent, updated instructions can be sent such that the visual guidance 504 is updated to reflect a reduced quantity of an item to be picked. The visual guidance 504, as shown, can include a quantity to be picked 507 and an item identifier 508, which may be a unique product code. The visual guidance 504 may be provided by light projection devices (not shown) in communication with the order fulfillment control center via the communication network (as in FIG. 1).

Figure 5B:
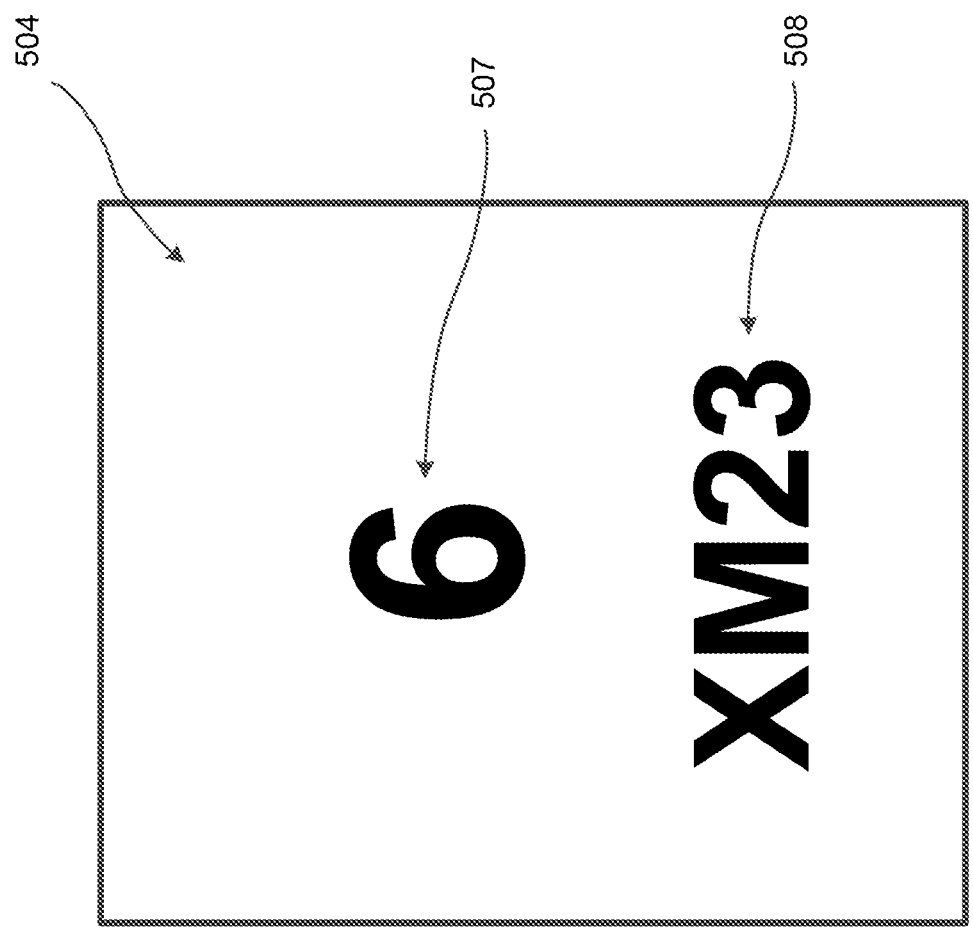
FIG. 5B is an illustration of an item storage bin within an order fulfillment center, according to exemplary embodiments.

Referring now to FIG. 5B, it can be appreciated that the visual guidance 504 on the surface of the item storage bins may be provided by light projection devices mounted or otherwise arranged within the order fulfillment center in fixed positions or known relative positions to the array of item storage bins. The visual guidance 504 may include, in an example, a quantity of an item to be picked 507 and an item identifier 508.

In embodiments, the visual guidance 504 may be arbitrary and at the discretion of the controller of the order fulfillment system. For instance, computing device(s) at the order fulfillment control center may access a product database or another device to retrieve text-based item descriptions, clip art, or other vector-based graphics data (e.g., drawings representing outlines of items or inventory areas), font data, images of items and/or inventory areas, or any other data that may be sent to light projection devices for display. In other embodiments, computing device(s) at the order fulfillment control center may execute software configured to convert text, graphics, and/or image data into an input format compatible with these light projection devices (e.g., a machine language or other instruction encoding) before sending it to the devices. In such embodiments, the light projection devices may include logic for executing the encoded instructions to present the desired projected visual guidance.

In embodiments, and as noted above, an initial state map of the storage bins can be used to generate a set of projection instructions for the light projection devices. The projection instructions can be based on spatial relationships between each of the light projection devices and each of the item storage bins, and the spatial relationships and related instructions can be calculated in advance on the basis of the particular setup and identities of the items stored within the item storage bins. To this end, projection instructions may include instructions for controlling a particular light projection device, so that visual guidance is displayed at the appropriate location in the order fulfillment center (i.e. the correct item storage bin). For example, projection instructions may include instructions that specify a direction and an angle at which the light projection device should be oriented or should orient itself so that information related to the current outstanding order(s) is projected at a specific surface of a particular item storage bin and/or so that a light beam or laser beam is directed to point to a specific position or item within an inventory area. Note that in some embodiments, the orientation and/or angle of both fixed location light projection devices and mobile light projection devices may be manipulated, while in others, some or all of the light projection devices may be configured to present a display at a fixed orientation and/or angle. Projection instructions may in some embodiments include instructions for controlling how information (e.g., visual guidance) is projected by light projection devices. For example, the order fulfillment control center may generate projection instructions that specify a format for projection (e.g., a light beam, a laser beam, text, or an image), a color for a projection (which may be used to distinguish between instructions for different associates, orders, or picking operations), or a duration for a projection. In some embodiments, projection instructions may include a "begin display' or "end display' indication. In embodiments in which a single light projection device may present information for two or more different associates, orders, or picking operations, projection instructions may specify whether information should be projected concurrently (e.g., overlaid) or if it should be projected in an alternating or rotating fashion. In other embodiments, the order fulfillment control center may explicitly manage such overlays or alternating/rotating projections by combining or time multiplexing the projection information before sending it to the light projection devices. In still other embodiments, the order fulfillment control center may select or generate projection instructions from a series of predefined projection schemes or templates, which may be stored in a product database, the light projection devices, or in another device configured to store such information. Projection instructions may in some embodiments be sent to the light projection devices as program instructions encoded within messages, and the light projection devices may include program instructions executable by processors to decode them and to perform the requested actions.

In embodiments, the light projection devices may project the visual guidance onto surfaces of the item storage bins to convey, as above, more than a quantity and an item identifier. For instance, an item may be designated as urgent by the order fulfillment control center and the corresponding light projection instructions may dictate the visual guidance be displayed in a different color from normal in order to convey the urgency. Moreover, in some instances, the visual guidance may be provided so as to accommodate color blind picking associates. In some instances, the visual guidance may be themed visual guidance, including a background, effects, and other visual treats that improve associate morale. To this end, the visual guidance may reflect holidays, seasons, and other events that may be important to the associates.

Figure 6A:
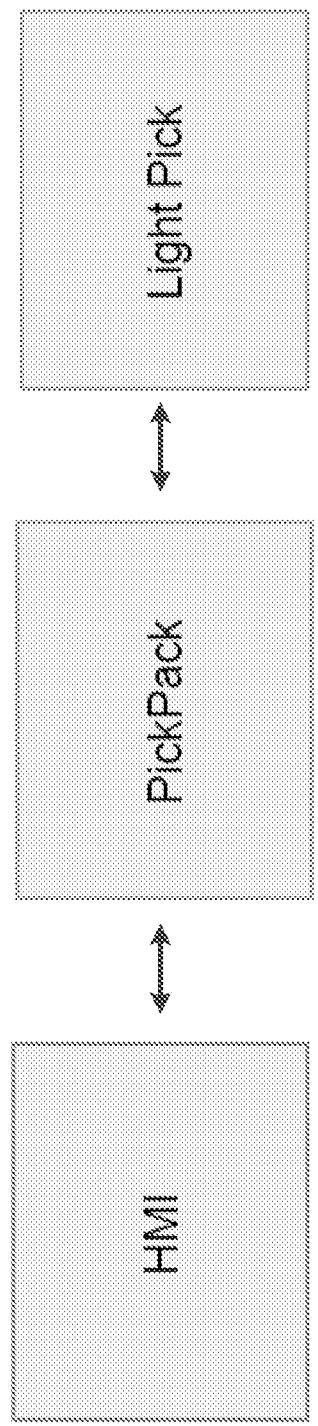
FIG. 6A is a schematic indicating relationships between a human machine interface, PickPack, and Light Pick, according to exemplary embodiments.
Figure 6B:
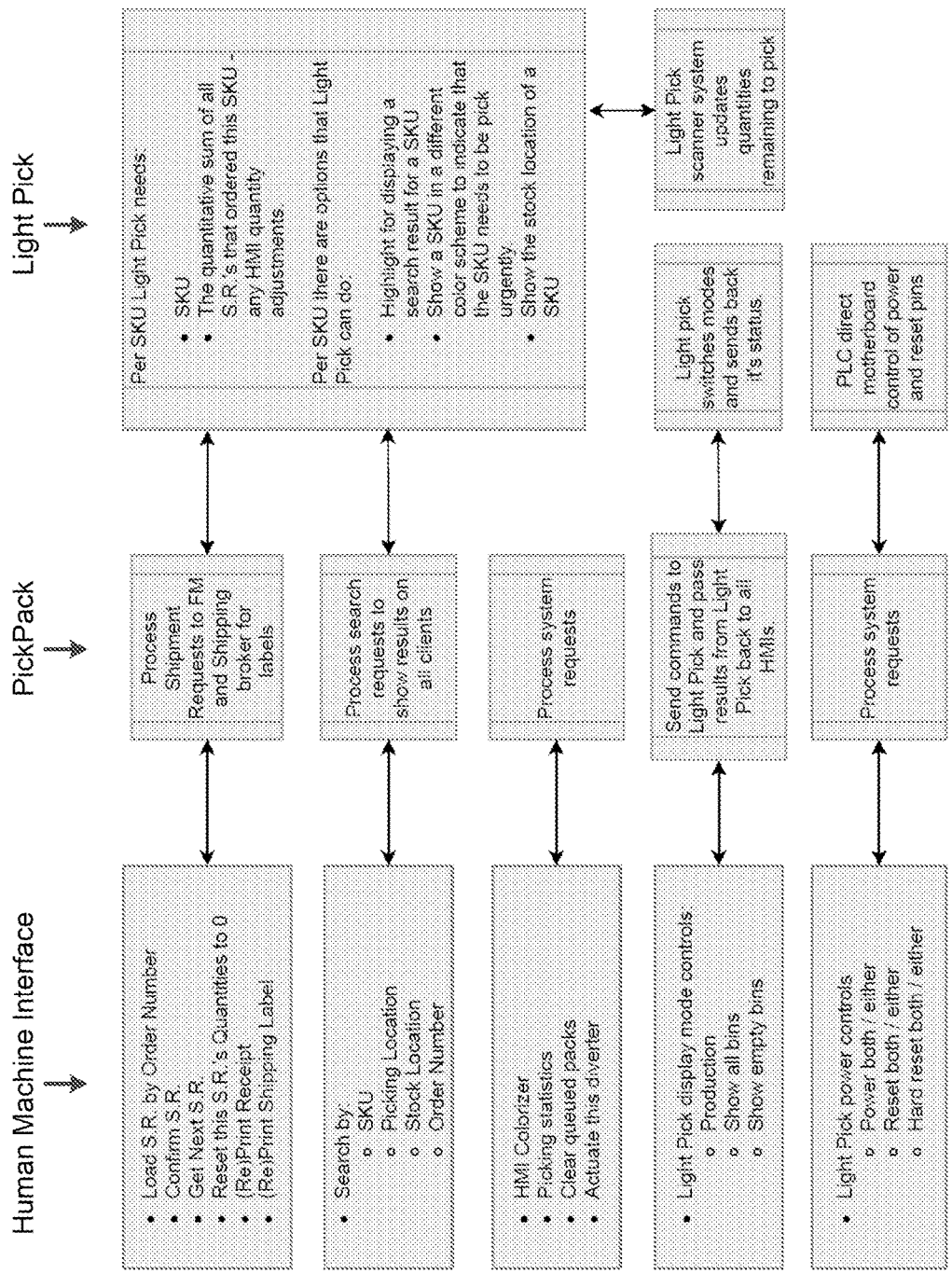
FIG. 6B is a schematic indicating relationships between a human machine interface, PickPack, and Light Pick, according to exemplary embodiments.

Referring now to FIG. 6A and FIG. 6B, relationships between a human machine interface (HMI), a PickPack system, and the Light Pick described herein are shown. PickPack is a control system that interfaces with Light Pick to send Light Pick data to display via the light projection devices at the order fulfillment center. PickPack includes a sortation head at the soring area that includes HMIs, receipt printers, label printers, scales, and other shipping hardware and software, among others. Associates at the sorting are may interact with the HMIs to impact Light Pick via PickPack, in certain instances.

Figure 7B:
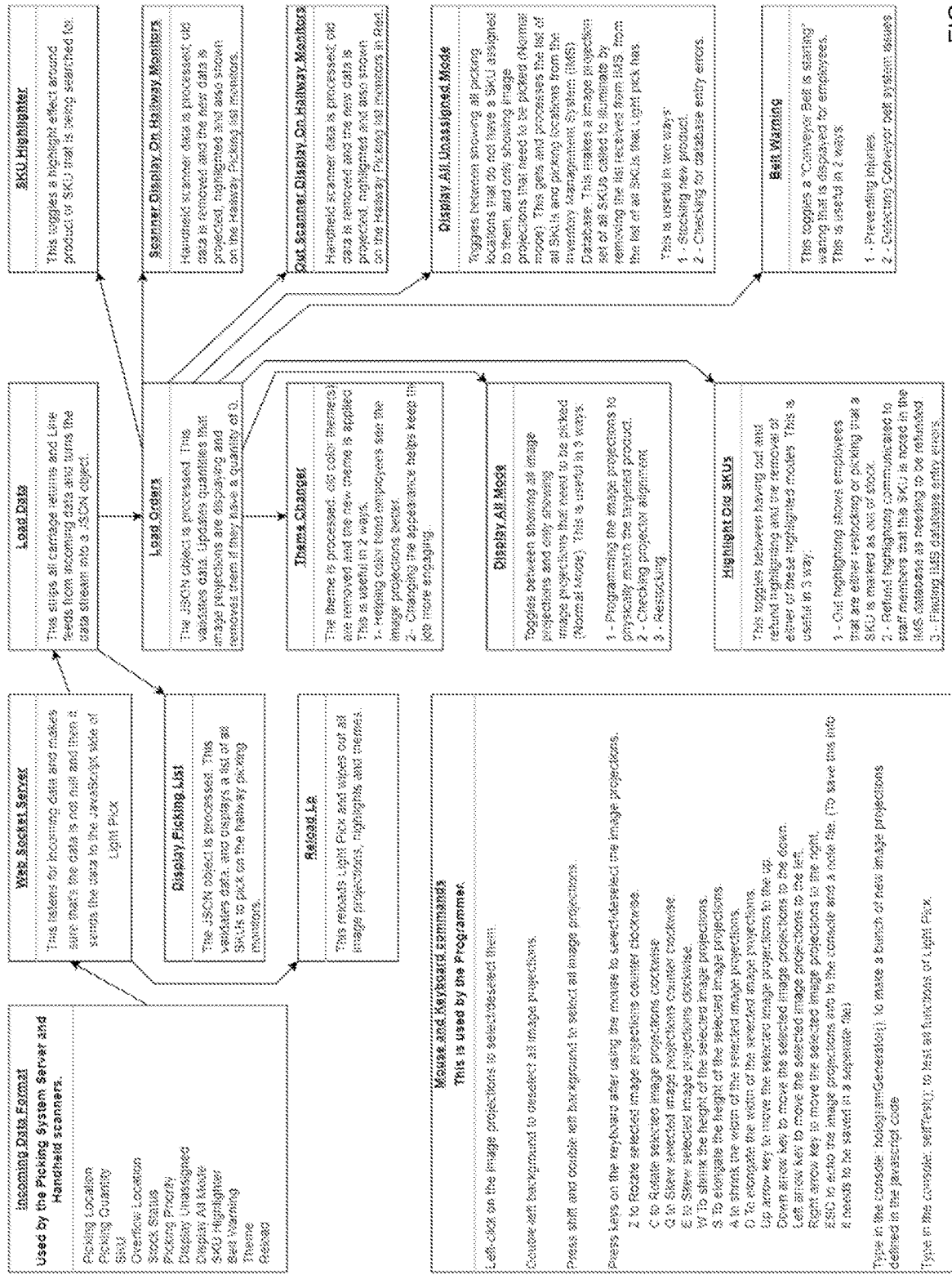
FIG. 7B is a flow diagram of processes of Light Pick, according to exemplary embodiments.

Referring now to FIG. 7A and FIG. 7B, FIG. 7A provides a high level schematic corresponding to the detailed schematic and/or flow diagram (or pseudo-code) of FIG. 7B. Both are directed to Light Pick. In particular, FIG. 7A illustrates the flow of data, in view of Light Pick, as processed by the order fulfillment control center and as transmitted to and displayed at the order fulfillment center.

In embodiments, incoming data format 750 includes information used by a picking system server at the order fulfillment center and by image scanning device(s) (handheld or fixed). This information includes picking location, picking quantity, SKU, overflow location, stock status, picking priority, display unassigned, display all mode, SKU highlighter, belt warning, theme, and reload.

In embodiments, the web socket server 751 listens for incoming data, ensures the data is not null, and then sends the data to the JavaScript side of Light Pick. Reload Light Pick 752 reloads Light Pick and wipes out all three-dimensional projections, highlights, and themes. In embodiments, Load Data 753 strips all carriage returns and Line feeds from incoming data and turns the data stream into a JSON object. Load Orders 754 processes the JSON object. This validates the data, updates quantities that the three-dimensional projections are displaying, and removes three-dimensional projections with a quantity of zero or less.

In embodiments, the remainder of Light Pick, as in FIG. 7A and FIG. 7B, stems from Load Orders 754. Theme Changer 755 processes themes, removing the old color theme(s) and applying the new color theme(s). Color theme(s) can include (1) adjustments to permit color blind employees, or otherwise visually impaired employees, to better see the three-dimensional projections and (2) changing the appearance to maintain associate engagement. Display All Mode 756 toggles between showing all three-dimensional projections and only showing three-dimensional projections that need to be picked (Normal Mode). This is useful to allow for (1) programming the three-dimensional projections to physically match the targeted product, (2) checking projector alignment, and (3) restocking. Highlight Old SKUs 757 toggles between having out and refund highlighting and the removal of either of these highlighted modes. This is useful as (1) Out Highlighting shows employees that are either restocking or picking that a SKU is marked as out of stock, (2) Refund Highlighting communicated to staff members that this SKU is noted in the Inventory Management System (IMS) database as needing to be refunded, and (3) Finding IMS database entry errors. The SKU Highlighter 758 toggles a highlight effect around a product or a SKU that is being searched for. The Scanner Display on Hallway Monitors 759 includes processing handheld scanner data, wherein old data is removed, and new data is highlighted. Moreover, the new data is shown on the Hallway Picking list monitors. Out Scanner Display On Hallway Monitors 760 includes processing handheld scanner data, wherein old data is removed, and new data is highlighted. Moreover, the new data is shown on the Hallway Picking List monitors in red. Display All Unassigned Mode 761 toggles between showing all picking locations that do not have a SKU assigned to them, and only showing three-dimensional projections that need to be picked (Normal Mode). This gets and processes the list of all SKUs and picking locations from the IMS database. This makes a three-dimensional projection set of all SKUs called to illuminate by removing the list received from IMS, from the list of all SKUs that Light Pick has. This is useful to help in stocking a new product and in checking the IMS database for entry errors. Belt Warning 762 toggles a "Conveyer Belt is starting" warning that is displayed on the item storage bins for associates, helping to prevent injuries and detecting if the conveyance system has issues.

In embodiments, an appearance of the visual guidance displayed by the light projection devices on the surfaces of the item storage bins can be configured by a programmer. The programmer can configure instructions to rotate three-dimensional projections clockwise and counterclockwise, to shrink the height of a selected three-dimensional projection, to elongate the height of a selected three-dimensional projection, to shrink the width of a selected three-dimensional projection, to elongate the width of a selected three-dimensional projection, and/or to translate a selected three-dimensional projection (e.g., up, down, left, right), among others. In embodiments, the programmer can configure instructions to modify a shape of the three-dimensional projection in order to accommodate an angle at which the three-dimensional projection is delivered to the surface of the item storage bin. For instance, a normally rectangular shape of a three-dimensional projection may be delivered to a particular item storage bin surface as a trapezoidal shape.

In embodiments, the adjustments to the visual guidance can be based on a topology of the surfaces of the item storage bins. For instance, the required adjustments may be different when a display surface of the item storage bins is flat than when the display surface of the item storage bins is curved, stepped, or otherwise features elevation changes. Moreover, such topological differences of the display surfaces of the item storage bins can be accounted for by the three-dimensional projection mapping system of the present disclosure. While two-dimensional projection mapping may be feasible for flat display surfaces, three-dimensional projection mapping using, e.g., Blender 3D, can permit topological differences in the display surface to be accounted for when the visual guidance is projected onto the display surface.

Figure 8:
FIG. 8 is an image of visual guidance displayed on a surface of item storage bins, according to exemplary embodiments.

Referring now to FIG. 8, item storage bins having visual guidance projected thereon by light projection devices are shown. In embodiments, ambient light can be reduced to highlight the visual guidance. As in FIG. 8, the visual guidance can include a quantity to be picked (top number) and an item identifier (bottom text).

Figure 9A:
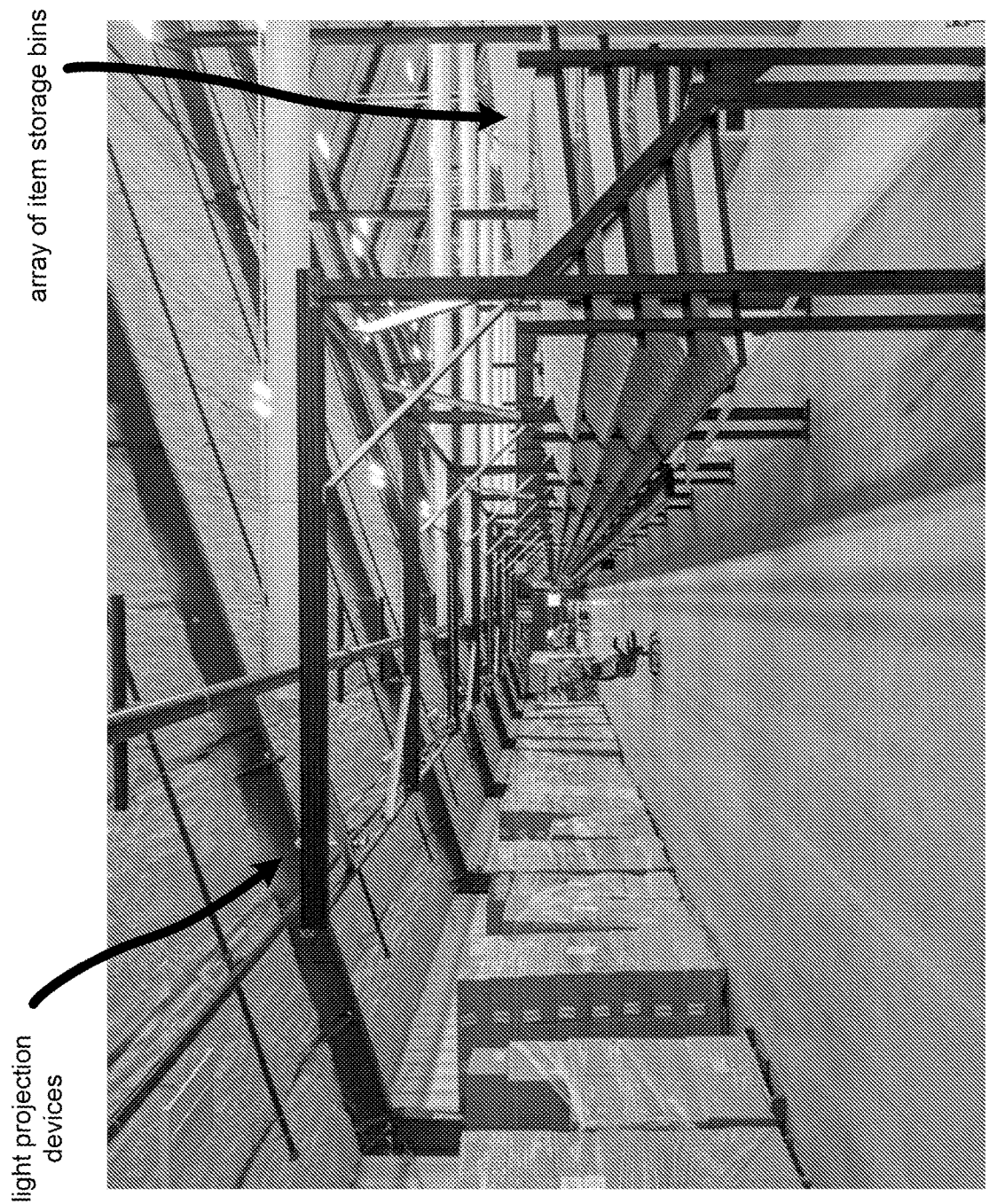
FIG. 9A is an image of item storage bins within an order fulfillment center, according to exemplary embodiments.
Figure 9B:
FIG. 9B is an image of item storage bins within an order fulfillment center, according to exemplary embodiments.

FIG. 9A and FIG. 9B illustrate an order fulfillment center, according to an exemplary embodiment of the present disclosure. FIG. 9A illustrates light projection devices mounted to the infrastructure of the order fulfillment center and an array of item storage bins arranged to the right. FIG. 9B further illustrates exemplary item storage bins of the order fulfillment center in a Display All mode. Further, FIG. 9B illustrates an exemplary main conveyer arranged in front of the array of item storage bins.

Referring now to FIG. 10, any of various computing devices, including those described herein, may be configured to implement three-dimensional projection mapping-based visual guidance for order fulfillment. For example, FIG. 10 is a schematic illustrating one embodiment of a computing device (e.g., a computer system) suitable for implementing the system and methods described herein. Computer system 1000 of FIG. 10 may be considered as one or more of the computing devices 111 of FIG. 1 and/or one or more components of the communication network 112 of FIG. 1 and/or the item storage bins 103 and the light projection devices 123 of FIG. 1 and/or the image scanning device 109 of FIG. 1. For instance, each of the communication network (e.g., local area network, wireless local area network), the plurality of item storage bins, the image scanning device(s), and the light projection devices may comprise a computing device (i.e., computer system 1000) integrated therein or communicatively coupled thereto to control the component and interface it with other components of the system. As it relates to computing devices 111, the computer system 1000 may be a user terminal and communicably coupled to a system of light projection devices of an order fulfillment center via a communication network. Such communicable coupling allows instructions from the computing devices 111 (i.e., computer system 1000) to control image projections onto surfaces of one or more of the item storage bins 103.

In the illustrated embodiment, computer system 1000 includes one or more processors 1010 (which may be referred to herein as processing circuitry) coupled to a system memory 1020 via an input/output (I/O) interface 1030. Computer system 1000 further includes a network interface 1040 coupled to I/O interface 1030. In some embodiments, computer system 1000 may be illustrative of a control system, and may, in other embodiments, include more, fewer, or different elements than those described with reference to computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general purpose or embedded processors implementing any of a variety of instruction set architectures (ISAS), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor 1010. In various embodiments, system memory 1020 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for an order fulfillment system, are shown stored within system memory 1020 as program instructions 1025. In some embodiments, system memory 1020 may include product database 1035. In other embodiments, remote storage 1070 may include a product database instead of, or in addition to, system memory 1020. For example, the information described herein as being stored in a product database may be partitioned between a database included in system memory 1020 and one or more databases included on one or more remote storage devices 1070, in various embodiments.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, for example, and the communication network 112 of FIG. 1. In particular, network interface 1040 may be configured to allow communication between computer system 1000 and various I/O devices 1050, control system 1060, and/or remote storage 1070. I/O devices 1050 may include light projection device(s), item storage bin(s), and/or image scanning device(s), as described herein. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fiber Channel SANs, or via any other suitable type of network and/or protocol.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1000 via I/O interface 1030. A computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In one embodiment, the relationship between control system 1060 and I/O devices 1050 may be a server/client type of relationship. For example, control system 1060 may be configured as a server computer system 1000 that may convey instructions to and receive acknowledgements from I/O devices 1050. In such an embodiment, I/O devices 1050 may be relatively simple or "thin" client devices. For example, I/O devices 1050 may be configured as dumb terminals with display, data entry and communications capabilities, but otherwise little computational functionality. However, in some embodiments, I/O devices 1050 may be computer systems configured similarly to computer system 1000, including one or more processors 1010 and various other devices (though in some embodiments, a computer system 1000 implementing an I/O device 1050 may have somewhat different devices, or different classes of devices, compared to a computer system 1000 implementing control system 1060). It is further contemplated that in some embodiments, the functionality of control system 1060 may be distributed across some or all of I/O devices 1050. That is, in some embodiments, there may be no centralized point of control of the activity of order fulfillment center associates; rather, I/O devices 1050 may function in a cooperative, distributed fashion to coordinate the activities of the order fulfillment center.

In various embodiments, I/O devices 1050 (e.g., a light projection device(s)) may include, but are not limited to, one or more of handheld devices, devices worn by or attached to the associates, and devices integrated into or mounted on any mobile or fixed equipment of the order fulfillment center such as pushcarts, bins, totes, racks, shelves, tables, ceilings, walls, and work benches, according to various embodiments. I/O devices 1050 may further include, but are not limited to, one or more of personal computer systems, desktop computers, rack mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with control system 1060. In general, an I/O device 1050 may be any device that can communicate with control system 1060 and convey instructions to associates within the order fulfillment center. In one embodiment, at least some of the I/O devices 1050 may be configured to scan or otherwise read or receive codes or identifiers of various components in the order fulfillment facility and to communicate the entered codes to control system 1060 for use in directing associates in the various operations of the control center (e.g., bar code scanners, RFID readers, cameras, or any other sensing devices). Such components may include, but are not limited to, one or more of items, orders, modular sorting stations, modular bins, and compartments of modular bins.

In one embodiment, at least some of the I/O devices 1050 (e.g., a light projection device(s)) may be configured as laser-based devices and/or light-based devices, having the functionality described herein. More specifically, laser and image-enabled devices, as described herein, may include devices employing vector based laser technology (e.g., those having one horizontal and one vertical oscillating mirror), or raster-based laser technology (including MEMS technology and/or other techniques that include one mirror for each color), or any other suitable laser technology. In some embodiments, a laser and image enabled system may include one or more fixed-location, portable, or embedded projection display devices, or one or more wearable projection display devices, that utilize laser-based and/or light-based projection technology.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world.

NUMBERED EMBODIMENTS OF THE INVENTION

Notwithstanding the appended claims, the disclosure sets forth the following numbered embodiments:

(1) A three-dimensional projection mapping data display system for ubiquitous online order fulfillment, the system comprising a plurality of item storage bins, one or more light projection devices, and processing circuitry configured to receive first order information, communicate with the one or more light projection devices to display visual guidance onto a surface of one of the plurality of item storage bins based on the received first order information, the one of the plurality of item storage bins corresponding to an item requested by the first order information, the displayed visual guidance including a respective item identifier and a quantity of the item to be retrieved, receive data corresponding to a retrieved item, and update the communication with the one or more light projection devices to display updated visual guidance onto the surface of the one of the plurality of item storage bins based on the received data corresponding to the retrieved item, wherein the one or more light projection devices are three-dimensional light-based projectors.

(2) The system of (1), wherein the received data corresponding to the retrieved item is obtained from an image scanning device configured to determine an identity of the retrieved item.

(3) The system of either (1) or (2), wherein the received first order information includes an identity and a quantity of the item to be retrieved.

(4) The system of any one of (1) to (3), wherein the updated visual guidance includes, based on the received data corresponding to the retrieved item, reflects that the quantity of the item to be retrieved is reduced.

(5) The system of any one of (1) to (4), wherein the displayed visual guidance includes a stock location number indicating where remaining item stock is located.

(6) The system of any one of (1) to (5), wherein the displayed visual guidance includes thematic graphics based on visual capabilities of a viewer.

(7) The system of (6), wherein the thematic graphics include motifs accommodating for color vision deficiency and holiday-colored themes.

(8) The system of any one of (1) to (7), wherein the displayed visual guidance includes a visual indication when the item is out of stock.

(9) The system of any one of (1) to (8), wherein the displayed visual guidance includes a visual indication an item needs be refunded.

(10) The system of any one of (1) to (9), wherein the respective item identifier is one selected from the group consisting of a common Universal Product Code (UPC) and a Stock-Keeping Unit (SKU) code.

(11) A method of three-dimensional projection mapping data display for ubiquitous online order fulfillment, the method comprising receiving, by processing circuitry, first order information, communicating, by the processing circuitry, with one or more light projection devices to display visual guidance onto a surface of one of a plurality of item storage bins based on the received first order information, the one of the plurality of item storage bins corresponding to an item requested by the first order information, the displayed visual guidance including a respective item identifier and a quantity of the item to be retrieved, receiving, by the processing circuitry, data corresponding to a retrieved item, and updating, by the processing circuitry, the communication with the one or more light projection devices to display updated visual guidance onto the surface of the one of the plurality of item storage bins based on the received data corresponding to the retrieved item, wherein the one or more light projection devices are three-dimensional light-based projectors.

(12) The method of (11), wherein the received data corresponding to the retrieved item is obtained from an image scanning device configured to determine an identity of the retrieved item.

(13) The method of either (11) or (12), wherein the received first order information includes an identity and a quantity of the item to be retrieved.

(14) The method of any one of (11) to (13), wherein the updated visual guidance includes, based on the received data corresponding to the retrieved item, reflects that the quantity of the item to be retrieved is reduced.

(15) The method of any one of (11) to (14), wherein the displayed visual guidance includes a stock location number indicating where remaining item stock is located.

(16) The method of any one of (11) to (15), wherein the displayed visual guidance includes thematic graphics based on visual capabilities of a viewer.

(17) The method of (16), wherein the thematic graphics include motifs accommodating for color vision deficiency and holiday-colored themes.

(18) The method of any one of (11) to (17), wherein the displayed visual guidance includes a visual indication when the item is out of stock.

(19) The method of any one of (11) to (18), wherein the displayed visual guidance includes a visual indication an item needs be refunded.

(20) The method of any one of (11) to (19), wherein the respective item identifier is one selected from the group consisting of a common Universal Product Code (UPC) and a Stock-Keeping Unit (SKU) code.

(21) A non-transitory computer-readable storage medium storing computer-readable instructions that, when executed by a computer, cause the computer to perform a method of three-dimensional projection mapping data display for ubiquitous online order fulfillment, the method comprising receiving first order information, communicating with one or more light projection devices to display visual guidance onto a surface of one of a plurality of item storage bins based on the received first order information, the one of the plurality of item storage bins corresponding to an item requested by the first order information, the displayed visual guidance including a respective item identifier and a quantity of the item to be retrieved, receiving data corresponding to a retrieved item, and updating the communication with the one or more light projection devices to display updated visual guidance onto the surface of the one of the plurality of item storage bins based on the received data corresponding to the retrieved item, wherein the one or more light projection devices are three-dimensional light-based projectors.

(22) The non-transitory computer-readable storage medium of (21), wherein the received data corresponding to the retrieved item is obtained from an image scanning device configured to determine an identity of the retrieved item.

(23) The non-transitory computer-readable storage medium of either (21) or (22), wherein the received first order information includes an identity and a quantity of the item to be retrieved.

(24) The non-transitory computer-readable storage medium of any one of (21) to (23), wherein the updated visual guidance includes, based on the received data corresponding to the retrieved item, reflects that the quantity of the item to be retrieved is reduced.

(25) The non-transitory computer-readable storage medium of any one of (21) to (24), wherein the displayed visual guidance includes a stock location number indicating where remaining item stock is located.

(26) The non-transitory computer-readable storage medium of any one of (21) to (25), wherein the displayed visual guidance includes thematic graphics based on visual capabilities of a viewer.

(27) The non-transitory computer-readable storage medium of (26), wherein the thematic graphics include motifs accommodating for color vision deficiency and holiday-colored themes.

(28) The non-transitory computer-readable storage medium of any one of (21) to (27), wherein the displayed visual guidance includes a visual indication when the item is out of stock.

(29) The non-transitory computer-readable storage medium of any one of (21) to (28), wherein the displayed visual guidance includes a visual indication an item needs be refunded.

(30) The non-transitory computer-readable storage medium of any one of (21) to (29), wherein the respective item identifier is one selected from the group consisting of a common Universal Product Code (UPC) and a Stock-Keeping Unit (SKU) code.

(31) A three-dimensional projection mapping data display system for ubiquitous online order fulfillment, the system comprising a plurality of item storage bins, one or more light projection devices, and processing circuitry configured to receive first order information, determine, for each item of the received first order information, availability of items defined by the received first order information, communicate, based on the determined availability of the items defined by the received first order information, with the one or more light projection devices to display visual guidance onto a surface of one of the plurality of item storage bins, the one of the plurality of item storage bins corresponding to an item requested by the first order information, the displayed visual guidance including a respective item identifier and a quantity of the item to be retrieved, receive data corresponding to the item to be retrieved, compare the received data to the received first order information, when the comparison indicates one or more items remain to be retrieved, determine, based on the received data, availability of remaining items defined by the received first order information, and update the communication with the one or more light projection devices to display updated visual guidance onto the surface of the one of the plurality of item storage bins based on the determined availability of the remaining items defined by the received first order information and based on the received data, wherein the one or more light projection devices are three-dimensional light-based projectors.

(32) The system of (31), wherein the received data corresponding to the retrieved item is obtained from an image scanning device configured to determine an identity of the retrieved item.

(33) The system of either (31) or (32), wherein the received first order information includes an identity and a quantity of the item to be retrieved.

(34) The system of any one of (31) to (33), wherein the updated visual guidance includes, based on the received data corresponding to the retrieved item, reflects that the quantity of the item to be retrieved is reduced.

(35) The system of any one of (31) to (34), wherein the displayed visual guidance includes a stock location number indicating where remaining item stock is located.

(36) The system of any one of (31) to (35), wherein the displayed visual guidance includes thematic graphics based on visual capabilities of a viewer.

(37) The system of (36), wherein the thematic graphics include motifs accommodating for color vision deficiency and holiday-colored themes.

(38) The system of any one of (31) to (37), wherein the displayed visual guidance includes a visual indication when the item is out of stock.

(39) The system of any one of (31) to (38), wherein the displayed visual guidance includes a visual indication an item needs be refunded.

(40) The system of any one of (31) to (39), wherein the respective item identifier is one selected from the group consisting of a common Universal Product Code (UPC) and a Stock-Keeping Unit (SKU) code.

(41) A three-dimensional projection mapping data display system for ubiquitous online order fulfillment, the system comprising a plurality of item storage bins, one or more light projection devices, and processing circuitry configured to receive information regarding one or more outstanding orders, determine availability for a first remaining item of the received information regarding the one or more outstanding orders, communicate, based on the determined availability of the first remaining item of the received information, with the one or more light projection devices to display visual guidance onto a surface of one of the plurality of item storage bins, the one of the plurality of item storage bins corresponding to an item associated with the first remaining item of the received information, the displayed visual guidance including a respective item identifier and a quantity of the item associated with the first remaining item of the received information, receive data corresponding to the item, compare the received data to the quantity of the item associated with the first remaining item of the received information, when the comparison indicates one or more items remain to be retrieved, determine, based on the received data, availability of the one or more items remaining to be retrieved, and update the communication with the one or more light projection devices to display updated visual guidance onto the surface of the one of the plurality of item storage bins based on the determined availability of the one or more items remaining to be retrieved, wherein the one or more light projection devices are three-dimensional light-based projectors.

(42) The system of (41), wherein the received data corresponding to the retrieved item is obtained from an image scanning device configured to determine an identity of the retrieved item.

(43) The system of either (41) or (42), wherein the received information includes an identity and a quantity of one or more items to be retrieved.

(44) The system of any one of (41) to (43), wherein the updated visual guidance includes, based on the received data corresponding to the item, reflects that the quantity of the first remaining item to be retrieved is reduced.

The invention claimed is:

1. A three-dimensional projection mapping data display system for ubiquitous online order fulfillment, the system comprising:
 a plurality of item storage bins;
 one or more fixed-location light projection devices; and
 processing circuitry configured to:
  receive first order information;
  communicate with the one or more fixed-location light projection devices to display visual guidance onto a surface of one of the plurality of item storage bins based on the received first order information, the one of the plurality of item storage bins corresponding to an item requested by the first order information, the displayed visual guidance including a respective item identifier and a quantity of the item to be retrieved;
  receive data corresponding to a retrieved item; and
  update the communication with the one or more fixed-location light projection devices to display updated visual guidance onto the surface of the one of the plurality of item storage bins based on the received data corresponding to the retrieved item,
 wherein the one or more fixed-location light projection devices are three-dimensional light-based projectors.

2. The system of claim 1, wherein the received data corresponding to the retrieved item is obtained from an image scanning device configured to determine an identity of the retrieved item.

3. The system of claim 1, wherein the received first order information includes an identity and a quantity of the item to be retrieved.

4. The system of claim 1, wherein the updated visual guidance includes, based on the received data corresponding to the retrieved item, reflects that the quantity of the item to be retrieved is reduced.

5. The system of claim 1, wherein the displayed visual guidance includes a stock location number indicating where remaining item stock is located.

6. The system of claim 1, wherein the displayed visual guidance includes thematic graphics based on visual capabilities of a viewer.

7. The system of claim 6, wherein the thematic graphics include motifs accommodating for color vision deficiency and holiday-colored themes.

8. The system of claim 1, wherein the displayed visual guidance includes a visual indication when the item is out of stock.

9. The system of claim 1, wherein the displayed visual guidance includes a visual indication an item needs be refunded.

10. The system of claim 1, wherein the respective item identifier is one selected from the group consisting of a common Universal Product Code (UPC) and a Stock-Keeping Unit (SKU) code.

11. A method of three-dimensional projection mapping data display for ubiquitous online order fulfillment, the method comprising:

receiving, by processing circuitry, first order information;

communicating, by the processing circuitry, with one or more light projection devices to display visual guidance onto a surface of one of a plurality of item storage bins based on the received first order information, the one of the plurality of item storage bins corresponding to an item requested by the first order information, the displayed visual guidance including a respective item identifier and a quantity of the item to be retrieved;

receiving, by the processing circuitry, data corresponding to a retrieved item; and updating, by the processing circuitry, the communication with the one or more light projection devices to display updated visual guidance onto the surface of the one of the plurality of item storage bins based on the received data corresponding to the retrieved item, wherein the one or more light projection devices are three-dimensional light-based projectors.

12. A method of three-dimensional projection mapping data display for ubiquitous online order fulfillment, the method comprising:

receiving, by processing circuitry, first order information;

communicating, by the processing circuitry, with one or more fixed-location light projection devices to display visual guidance onto a surface of one of a plurality of item storage bins based on the received first order information, the one of the plurality of item storage bins corresponding to an item requested by the first order information, the displayed visual guidance including a respective item identifier and a quantity of the item to be retrieved;

receiving, by the processing circuitry, data corresponding to a retrieved item; and updating, by the processing circuitry, the communication with the one or more fixed-location light projection devices to display updated visual guidance onto the surface of the one of the plurality of item storage bins based on the received data corresponding to the retrieved item, wherein the one or more fixed-location light projection devices are three-dimensional light-based projectors.

13. The method of claim 11, wherein the received first order information includes an identity and a quantity of the item to be retrieved.

14. The method of claim 11, wherein the updated visual guidance includes, based on the received data corresponding to the retrieved item, reflects that the quantity of the item to be retrieved is reduced.

15. The method of claim 11, wherein the displayed visual guidance includes a stock location number indicating where remaining item stock is located.

16. The method of claim 11, wherein the displayed visual guidance includes thematic graphics based on visual capabilities of a viewer.

17. The method of claim 16, wherein the thematic graphics include motifs accommodating for color vision deficiency and holiday-colored themes.

18. The method of claim 11, wherein the displayed visual guidance includes a visual indication when the item is out of stock.

19. The method of claim 11, wherein the displayed visual guidance includes a visual indication an item needs be refunded.

20. The method of claim 11, wherein the respective item identifier is one selected from the group consisting of a common Universal Product Code (UPC) and a Stock-Keeping Unit (SKU) code.

21. A non-transitory computer-readable storage medium storing computer-readable instructions that, when executed by a computer, cause the computer to perform a method of three-dimensional projection mapping data display for ubiquitous online order fulfillment, the method comprising:

receiving first order information;

communicating with one or more fixed-location light projection devices to display visual guidance onto a surface of one of a plurality of item storage bins based on the received first order information, the one of the plurality of item storage bins corresponding to an item requested by the first order information, the displayed visual guidance including a respective item identifier and a quantity of the item to be retrieved;

receiving data corresponding to a retrieved item; and updating the communication with the one or more fixed-location light projection devices to display updated visual guidance onto the surface of the one of the plurality of item storage bins based on the received data corresponding to the retrieved item, wherein the one or more fixed-location light projection devices are three-dimensional light-based projectors.

22. The non-transitory computer-readable storage medium of claim 21, wherein the received data corresponding to the retrieved item is obtained from an image scanning device configured to determine an identity of the retrieved item.

23. The non-transitory computer-readable storage medium of claim 21, wherein the received first order information includes an identity and a quantity of the item to be retrieved.

24. The non-transitory computer-readable storage medium of claim 21, wherein the updated visual guidance includes, based on the received data corresponding to the retrieved item, reflects that the quantity of the item to be retrieved is reduced.

25. The non-transitory computer-readable storage medium of claim 21, wherein the displayed visual guidance includes a stock location number indicating where remaining item stock is located.

26. The non-transitory computer-readable storage medium of claim 21, wherein the displayed visual guidance includes thematic graphics based on visual capabilities of a viewer.

27. The non-transitory computer-readable storage medium of claim 21, wherein the displayed visual guidance includes a visual indication when the item is out of stock.

28. The non-transitory computer-readable storage medium of claim 21, wherein the displayed visual guidance includes a visual indication an item needs be refunded.

29. The non-transitory computer-readable storage medium of claim 21, wherein the respective item identifier is one selected from the group consisting of a common Universal Product Code (UPC) and a Stock-Keeping Unit (SKU) code.

30. A three-dimensional projection mapping data display system for ubiquitous online order fulfillment, the system comprising:

a plurality of item storage bins;

one or more fixed-location light projection devices; and processing circuitry configured to:

receive first order information;

determine, for each item of the received first order information, availability of items defined by the received first order information;

communicate, based on the determined availability of the items defined by the received first order information, with the one or more fixed-location light projection devices to display visual guidance onto a surface of one of the plurality of item storage bins, the one of the plurality of item storage bins corresponding to an item requested by the first order information, the displayed visual guidance including a respective item identifier and a quantity of the item to be retrieved;

receive data corresponding to the item to be retrieved;

compare the received data to the received first order information;

when the comparison indicates one or more items remain to be retrieved, determine, based on the received data, availability of remaining items defined by the received first order information; and update the communication with the one or more fixed-location light projection devices to display updated visual guidance onto the surface of the one of the plurality of item storage bins based on the determined availability of the remaining items defined by the received first order information and based on the received data, wherein the one or more fixed-location light projection devices are three-dimensional light-based projectors.

* * * * *